US012429816B2

(12) United States Patent
Oguni et al.

(10) Patent No.: US 12,429,816 B2
(45) Date of Patent: Sep. 30, 2025

(54) IMAGE FORMING APPARATUS

(71) Applicant: CANON KABUSHIKI KAISHA, Tokyo (JP)

(72) Inventors: Atsushi Oguni, Kanagawa (JP); Akitoshi Toyota, Kanagawa (JP); Akira Yoshimura, Shizuoka (JP); Akira Tatsuzue, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 58 days.

(21) Appl. No.: 18/424,692

(22) Filed: Jan. 26, 2024

(65) Prior Publication Data

US 2024/0255895 A1 Aug. 1, 2024

(30) Foreign Application Priority Data

Jan. 31, 2023 (JP) ................................ 2023-012439
Jan. 31, 2023 (JP) ................................ 2023-012671
(Continued)

(51) Int. Cl.
*G03G 21/20* (2006.01)
*G03G 15/00* (2006.01)
(Continued)

(52) U.S. Cl.
CPC ....... *G03G 21/206* (2013.01); *G03G 15/2053* (2013.01); *G03G 15/6502* (2013.01); *G03G 21/1633* (2013.01); *G03G 2221/1645* (2013.01)

(58) Field of Classification Search
CPC .. G03G 21/20; G03G 21/206; G03G 21/1633; G03G 21/1638; G03G 15/6502; G03G 2221/1645
See application file for complete search history.

(56) References Cited

U.S. PATENT DOCUMENTS

2005/0019058 A1 1/2005 Hirose et al. ............ B41J 29/00
2008/0050145 A1 2/2008 Hanano ................. H03H 21/20
(Continued)

FOREIGN PATENT DOCUMENTS

JP 2005-043662 2/2005
JP 2005-241934 9/2005
(Continued)

OTHER PUBLICATIONS

U.S. Appl. No. 18/655,164, filed May 3, 2024.

*Primary Examiner* — Thomas S Giampaolo, II
(74) *Attorney, Agent, or Firm* — Venable LLP

(57) ABSTRACT

An image forming apparatus includes an apparatus body, a sheet storage portion, and an air blowing portion disposed within the apparatus body. The apparatus body includes a body portion oriented toward an upstream side in an attaching direction of the sheet storage portion, the body portion including an air intake port, and a cover member provided to be openable and closable with respect to the body portion. The sheet storage portion includes a storage portion body and a storage portion cover. In a state where the cover member is closed with respect to the body portion and the sheet storage portion is attached to the apparatus body, the air intake port is disposed to be overlapped with the cover member and the storage portion cover when viewed in the attaching direction and is covered by the cover member and the storage portion cover.

31 Claims, 21 Drawing Sheets

(30) Foreign Application Priority Data

| | | |
|---|---|---|
| Jun. 27, 2023 | (JP) | 2023-104676 |
| Dec. 14, 2023 | (JP) | 2023-211538 |

(51) Int. Cl.

| | |
|---|---|
| ***G03G 15/20*** | (2006.01) |
| ***G03G 21/16*** | (2006.01) |

(56) References Cited

U.S. PATENT DOCUMENTS

| | | | | |
|---|---|---|---|---|
| 2017/0160699 | A1 | 6/2017 | Imanari et al. | G03G 21/20 |
| 2017/0251117 | A1 | 8/2017 | Shirota et al. | H04N 1/00 |
| 2021/0240126 | A1 | 8/2021 | Nagamine et al. | G03G 21/16 |
| 2021/0344154 | A1 | 11/2021 | Ide et al. | H01R 43/02 |
| 2022/0365480 | A1* | 11/2022 | Kawasumi | G03G 21/1633 |
| 2022/0365481 | A1* | 11/2022 | Watanabe | G03G 15/5045 |

FOREIGN PATENT DOCUMENTS

| | | |
|---|---|---|
| JP | 2008-077077 | 4/2008 |
| JP | 2010-002561 | 1/2010 |
| JP | 2015-075541 | 4/2015 |
| JP | 2017-107012 | 6/2017 |
| JP | 2020-175675 | 10/2020 |

* cited by examiner

IMAGE FORMING APPARATUS

BACKGROUND OF THE INVENTION

Field of the Invention

The present invention relates to an image forming apparatus for forming images on sheets.

Description of the Related Art

In general, fixing units and electric components generate heat in image forming apparatuses such as printers adopting an electrophotographic system, such that there is a need to cool the inner side of the image forming apparatus. Japanese Patent Application Laid-Open Publication No. 2017-107012 proposes an image forming apparatus equipped with a fan for generating an airflow for cooling the inner side of the image forming apparatus. The image forming apparatus includes a front door that can be opened and closed, and a side cover disposed on a side face of the image forming apparatus, wherein the side face on which the front door is disposed and the side cover are connected by a curved surface. An air intake port through which air is taken in by a fan is provided on each of the side cover and the curved surface, wherein the air intake port provided on the curved surface is arranged to be opposed to a grip portion of the front door.

However, according to the image forming apparatus disclosed in Japanese Patent Application Laid-Open Publication No. 2017-107012, the air intake port is disposed on a side cover which constitutes an exterior surface of the image forming apparatus, by which the appearance property is deteriorated. Further, the air intake port disposed on the curved surface has a small area, such that sufficient outer air may not be taken in to cool the image forming apparatus.

SUMMARY OF THE INVENTION

According to one aspect of the present invention, an image forming apparatus includes an apparatus body including an image forming portion configured to form an image on a sheet, a sheet storage portion configured to store the sheet and configured to be drawn out of and attached to the apparatus body, and an air blowing portion disposed within the apparatus body and configured to generate an airflow. The apparatus body includes a body portion oriented toward an upstream side in an attaching direction of the sheet storage portion, the body portion including an air intake port through which air taken in by the air blowing portion passes, and a cover member that is disposed upstream of the body portion in the attaching direction and provided to be openable and closable with respect to the body portion, and that covers a part of the body portion in a closed state. The sheet storage portion includes a storage portion body configured to store the sheet and a storage portion cover arranged upstream of the storage portion body in the attaching direction. In a state where the cover member is closed with respect to the body portion and the sheet storage portion is attached to the apparatus body, the air intake port is disposed to be overlapped with the cover member and the storage portion cover when viewed in the attaching direction and is covered by the cover member and the storage portion cover.

Further features of the present invention will become apparent from the following description of exemplary embodiments with reference to the attached drawings.

DESCRIPTION OF THE EMBODIMENTS

First Embodiment

Entire Configuration

Figure 1:
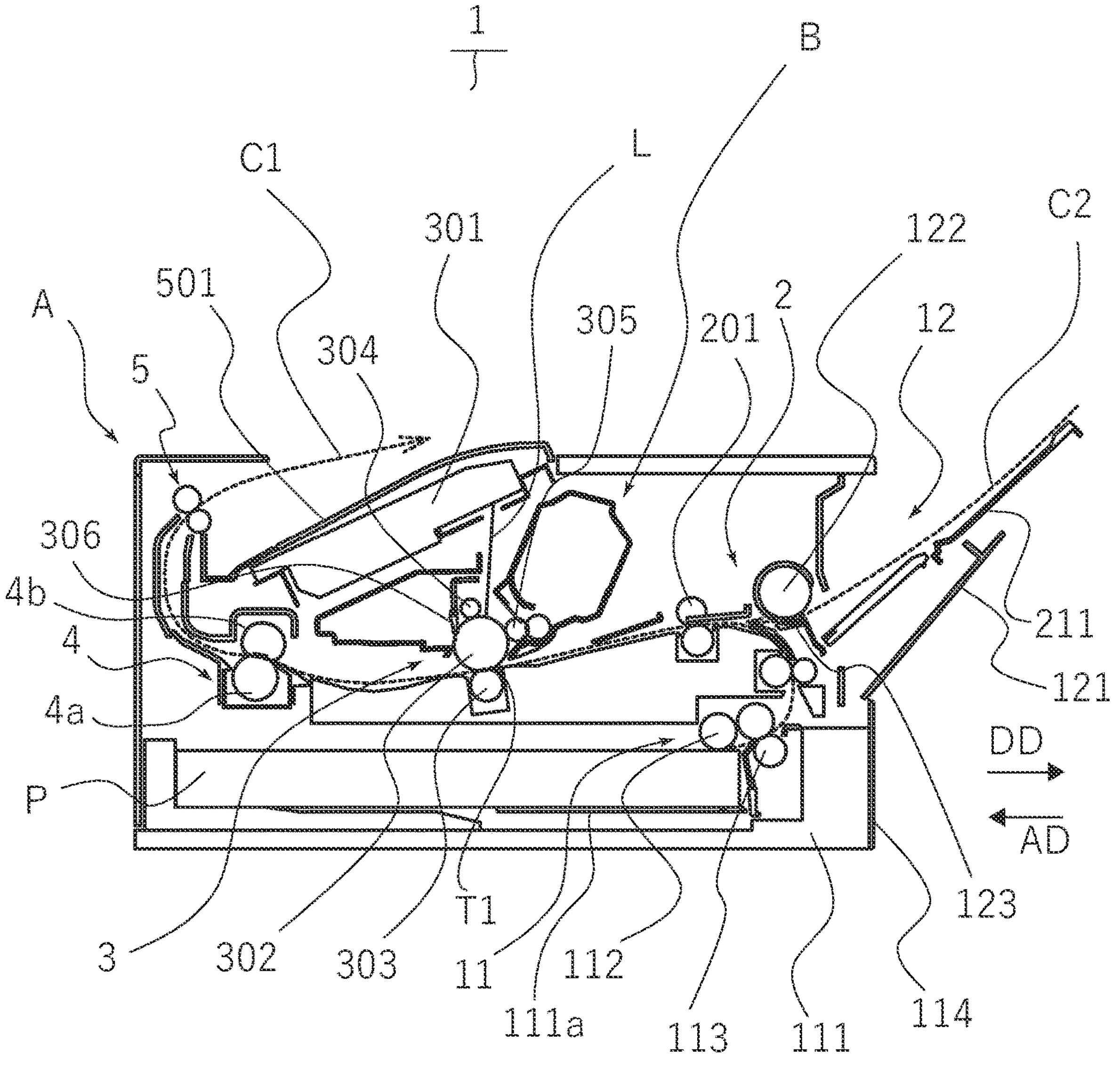
FIG. 1 is an entire schematic diagram illustrating a printer according to a first embodiment.

At first, a first embodiment of the present technique will be described. A printer 1 serving as an image forming apparatus according to the first embodiment is a laser beam printer of an electrophotographic system that forms a monochrome toner image. The printer 1 includes, as illustrated in FIG. 1, an apparatus body A having an approximately rectangular parallelopiped shape, and a cassette 111 that may be drawn out of and attached to the apparatus body A and that serves as a sheet storage portion for storing sheets P.

According to the present embodiment, an inserting and extracting direction of the cassette 111 is set to a front-rear direction of the apparatus body A, and an upstream side of an attaching direction AD of the cassette 111 is set to a front side of the apparatus body A. That is, a right side in FIG. 1 is the front side of the apparatus body A. Further, a right-left direction of the apparatus body A is set based on a state where the apparatus body A is viewed from the front side. The inserting and extracting direction of the cassette 111 includes the attaching direction AD and a draw-out direction DD, and the right-left direction of the apparatus body A is parallel to a width direction W (refer to FIG. 2A) serving as a orthogonal direction orthogonal to the inserting and extracting direction of the cassette 111 and a vertical direction.

The sheet P includes paper such as printer sheets and envelopes, plastic films such as overhead projector (OHP) sheets, and cloths.

The apparatus body A includes a sheet feeding portion 11 for feeding sheets P stored in the cassette 111, a conveyance portion 2 for conveying sheets fed by the sheet feeding portion 11, an image forming portion 3, a fixing portion 4, and a sheet discharge roller pair 5. The apparatus body A is provided with a manual sheet feed portion 12, and the sheet P may also be fed through the manual sheet feed portion 12 instead of from the cassette 111.

When an image forming job is output to the printer 1, an image forming process by the image forming portion 3 is started based on an image information entered from an external computer connected to the printer 1. The image forming portion 3 stored in the apparatus body A includes a process cartridge B, a laser scanner 301, and a transfer roller 303. The process cartridge B includes a photosensitive drum 302 serving as a rotatable image bearing member, and a charging unit 304, a developing roller 305, and a cleaning blade 306 which are disposed along the photosensitive drum 302. The photosensitive drum 302 and the transfer roller 303 form a transfer nip T1. The process cartridge B is detachably attached to the apparatus body A of the printer 1.

The laser scanner 301 irradiates a laser light L toward the photosensitive drum 302 based on the entered image information. In this state, the photosensitive drum 302 is charged in advance by the charging unit 304, and by having the laser light irradiated thereto, an electrostatic latent image is formed on the photosensitive drum 302. Thereafter, the electrostatic latent image is developed by the developing roller 305, and a monochrome toner image is formed on the photosensitive drum 302.

In parallel with the image forming process described above, the sheet P is fed from the cassette 111 or the manual sheet feed portion 12. For example, the sheet P stored in the cassette 111 is fed by a feed roller 112 of the sheet feeding portion 11 and separated one sheet at a time by a feed roller pair 113. The sheet P fed by the feed roller 112 passes through a first conveyance path C1. The cassette 111 is provided with a sheet supporting portion 111*a* capable of being lifted and lowered, and when an image forming job is entered, the sheet supporting portion 111*a* is pivoted upward. Thereby, the uppermost sheet P supported on the sheet supporting portion 111*a* comes into contact with the feed roller 112 and allows the sheet P to be fed. Further, the feed roller 112 may be configured to be lifted and lowered without having the sheet supporting portion 111*a* disposed thereto.

The sheet being fed from the manual sheet feed portion 12 passes through a second conveyance path C2. The manual sheet feed portion 12 includes a cover member 121 provided to be openable and closable, a sheet feed tray 211, a feed roller 122, and a separation pad 123.

The cover member 121 may be supported in an openable and closable manner to a frame of the apparatus body A. The sheet feed tray 211 is configured to pivot in an interlocked manner with the cover member 121, and by opening the cover member 121, sheets may be placed on the sheet feed tray 211. The sheets placed on the sheet feed tray 211 are fed by the feed roller 122 and separated one by one by a separation nip provided between the feed roller 122 and the separation pad 123.

The sheet P fed from the cassette 111 or the manual sheet feed portion 12 is conveyed by a conveyance roller pair 201 of the conveyance portion 2 at a matched timing with a transfer timing of the toner image at the transfer nip T1.

The toner image on the photosensitive drum 302 is transferred at the transfer nip T1 to the sheet P conveyed by the conveyance roller pair 201 by an electrostatic load bias applied to the transfer roller 303. Residual toner remaining on the photosensitive drum 302 is collected by the cleaning blade 306. Predetermined heat and pressure is applied at the fixing portion 4 to the sheet P to which the toner image has been transferred, by which toner is melted and fixed. The fixing portion 4 includes a pressure roller 4*a* and a heating unit 4*b* having a heater not shown. The sheet P having passed through the fixing portion 4 is discharged by the sheet discharge roller pair 5 onto a sheet discharge tray 501.

The printer 1 is a printer that prints images to only one side of the sheet P, but the present technique is not limited thereto. For example, the printer 1 may include a duplex conveyance portion that conveys the sheet P to the transfer nip T1 again after reversing the front and rear sides of the sheet P to which an image has been formed on a first side, to enable printing to be performed on both sides of the sheet P. The printer 1 may also include multiple layers of cassettes instead of only one layer of cassette 111.

Cooling Configuration of Apparatus Body

Figure 2A:
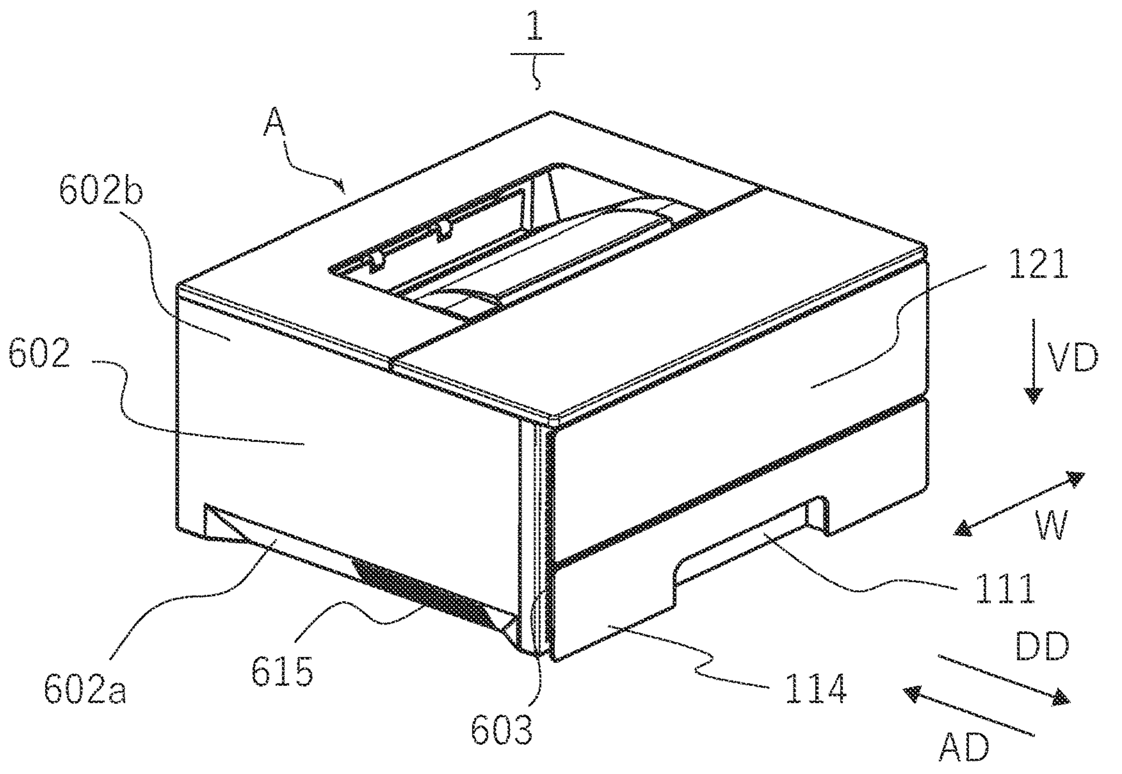
FIG. 2A is a perspective view illustrating the printer with a cover member closed and a cassette being attached to an apparatus body.
Figure 2B:
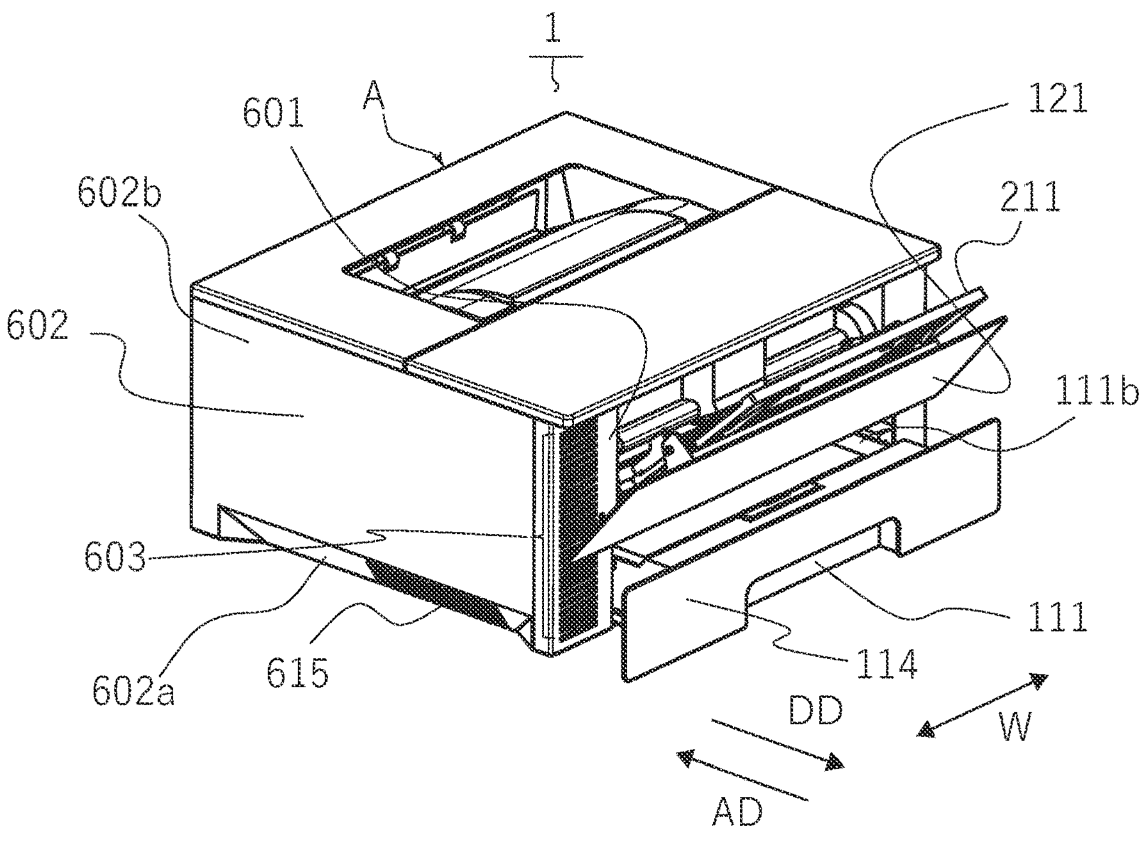
FIG. 2B is a perspective view illustrating the printer with the cover member opened and the cassette being drawn out of the apparatus body.
Figure 3A:
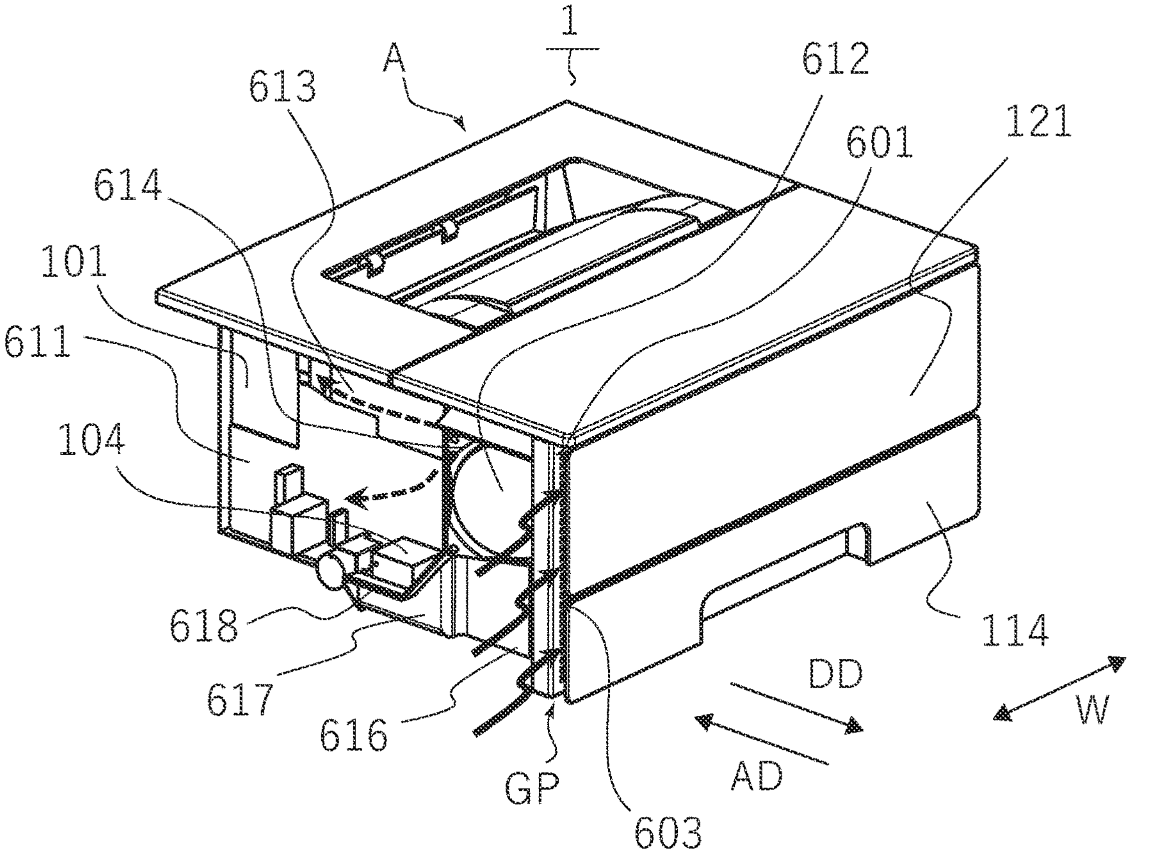
FIG. 3A is a perspective view illustrating the printer with a left cover removed.
Figure 3B:
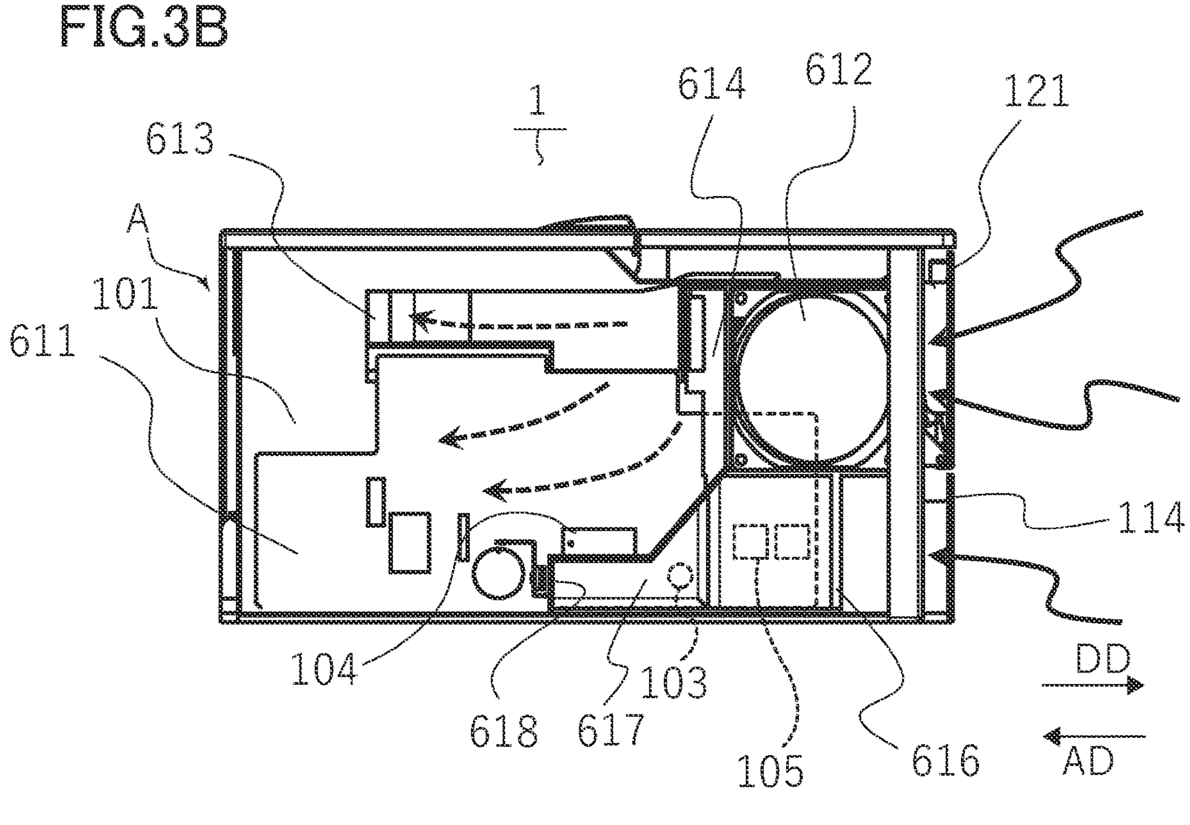
FIG. 3B is a side view illustrating the printer with the left cover removed.

Next, a cooling configuration for cooling the apparatus body A will be described with reference to FIGS. 2A to 4 and FIGS. 6A and 6B. FIG. 2A is a perspective view illustrating the printer 1 in a state where the cover member 121 is closed and the cassette 111 is attached to the apparatus body A. FIG. 2B is a perspective view illustrating the printer 1 in a state where the cover member 121 is opened and the cassette 111 is drawn out of the apparatus body A. FIG. 3A is a perspective view illustrating the printer 1 in a state where a left cover 602 is removed, and FIG. 3B is a side view illustrating the printer 1 in a state where the left cover 602 is removed.

Figure 4:
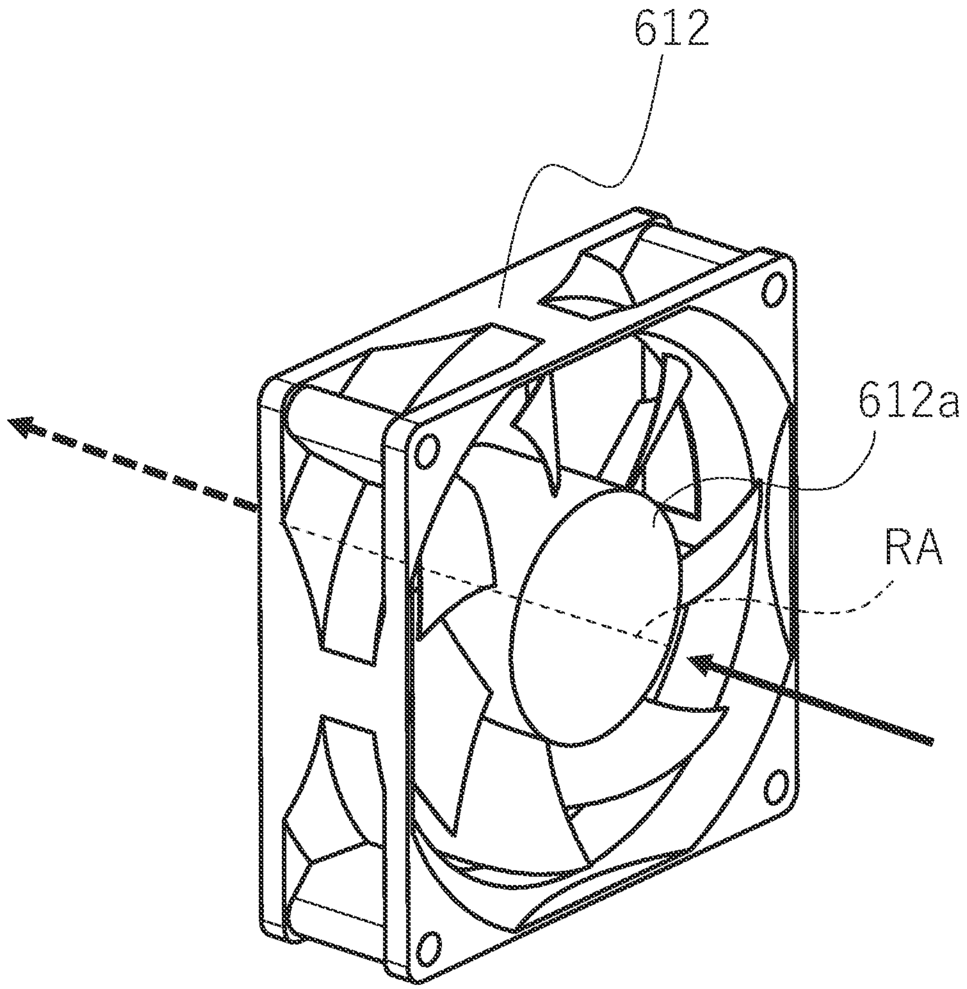
FIG. 4 is a perspective view illustrating a blower fan.
Figure 5A:
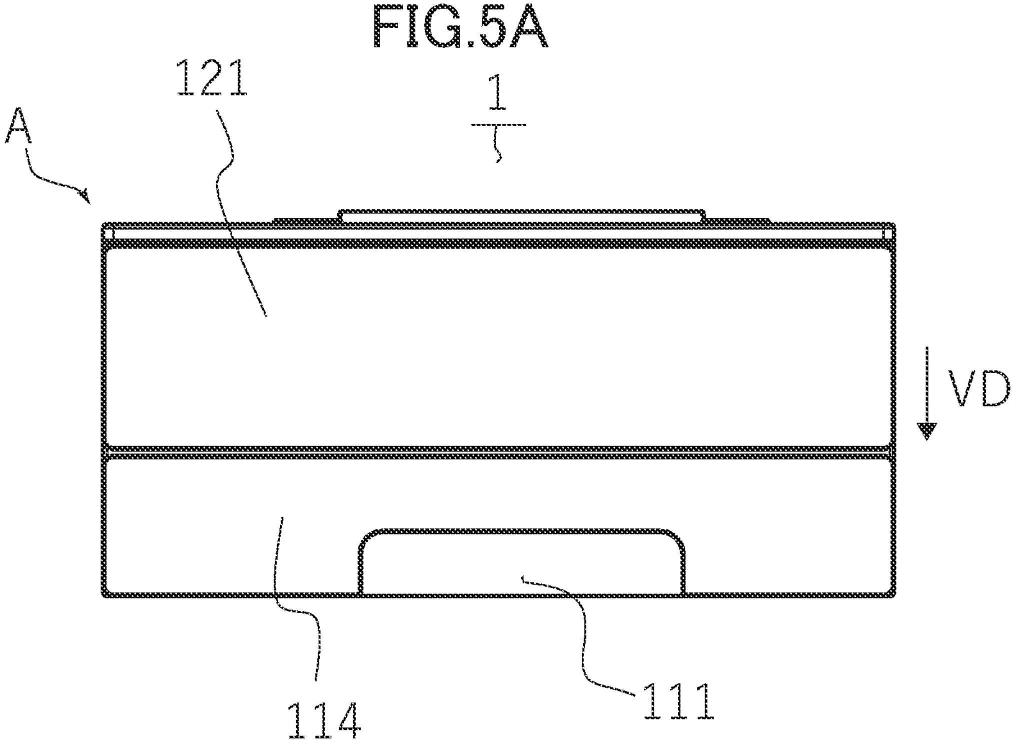
FIG. 5A is a front view illustrating the printer.
Figure 5B:
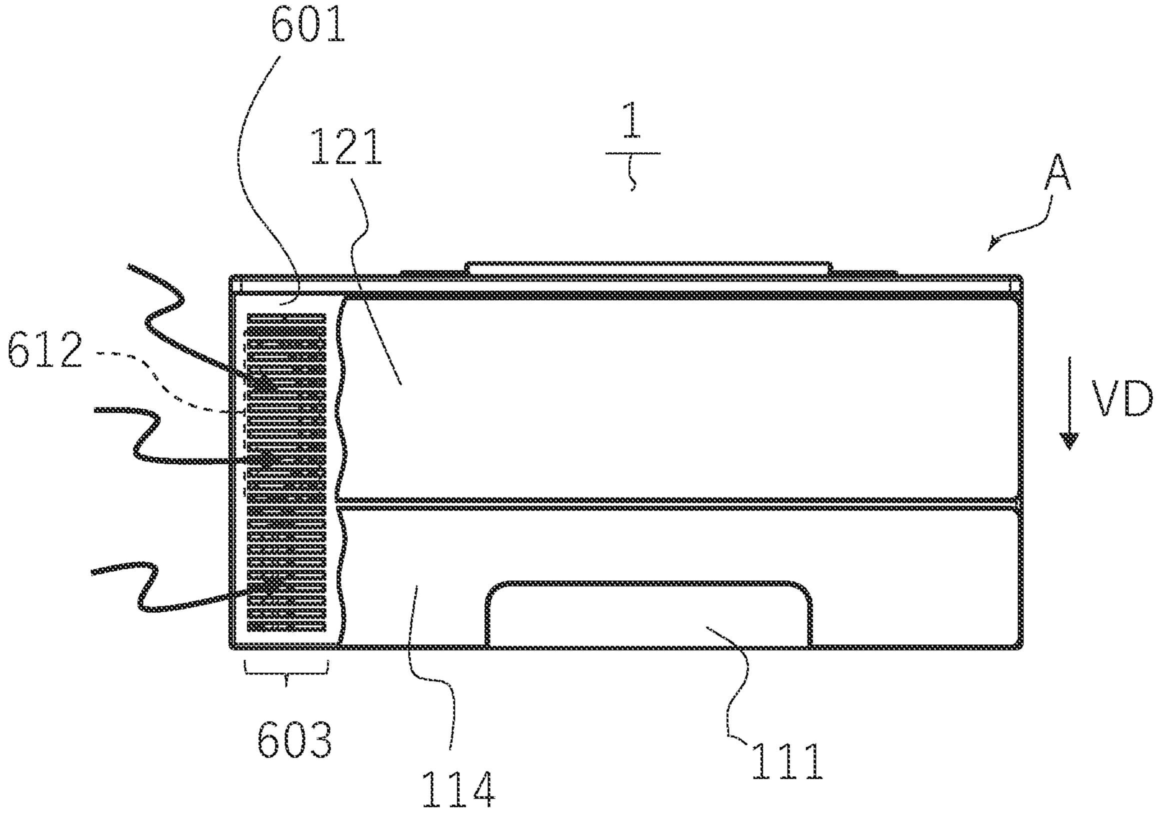
FIG. 5B is a front view of the printer with a part of the cover member and a cassette cover cut out.
Figure 6:
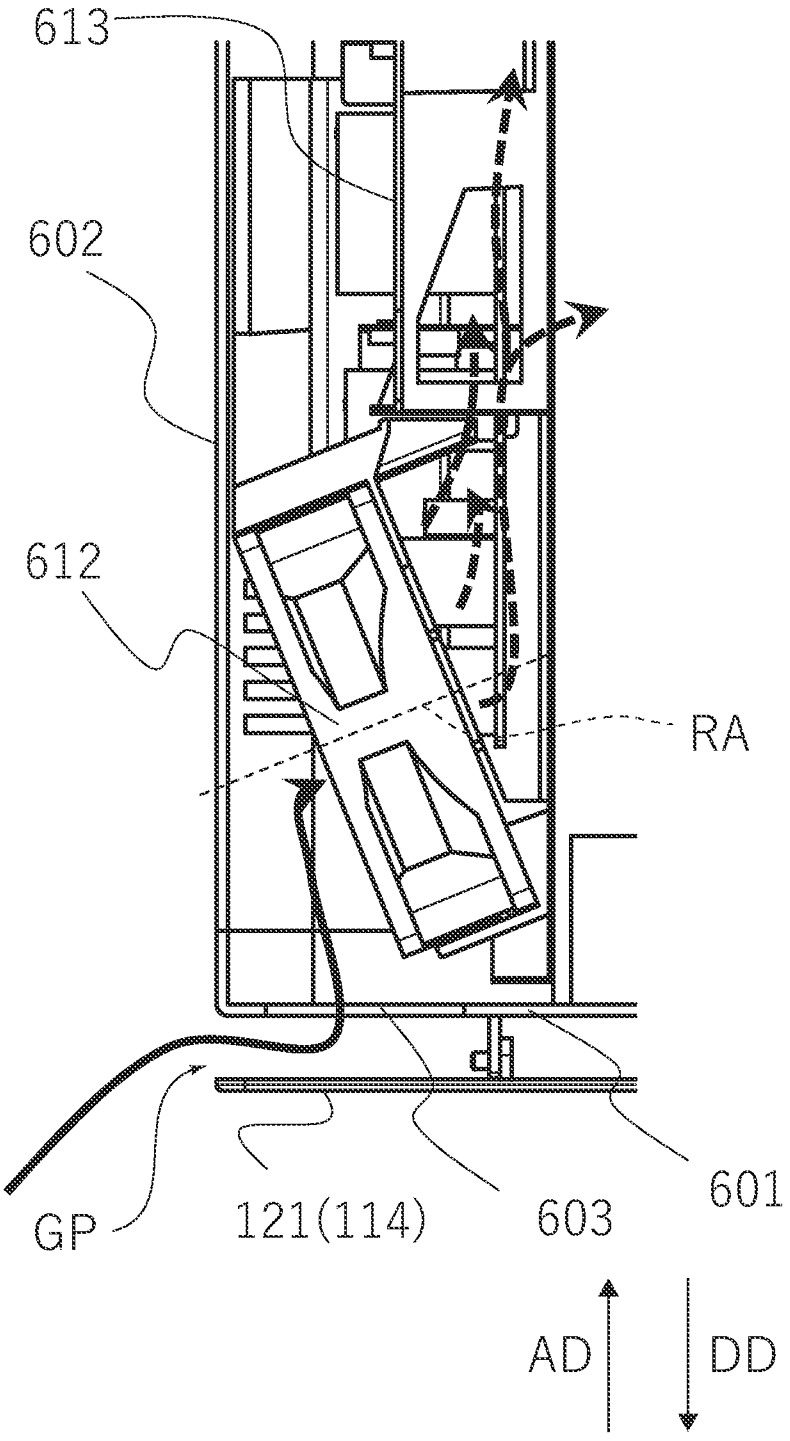
FIG. 6 is a cross-sectional view illustrating a cross section that is parallel to a horizontal direction of the apparatus body.

FIG. 4 is a perspective view illustrating a blower fan 612. FIG. 6 is a cross-sectional view illustrating a cross-section parallel to the horizontal direction of the apparatus body A. In FIGS. 3A to 6 excluding FIG. 4, blades of the blower fan 612 are not shown for simplification.

As illustrated in FIGS. 2A and 2B, the cassette 111 includes a cassette body 111*b* serving as a storage portion body for storing the sheet P, and a cassette cover 114 serving as a storage portion cover arranged upstream in the attaching direction AD of the cassette body 111*b*. The cassette cover 114 is disposed integrally with the cassette body 111*b*, and constitutes a part of an exterior of the printer 1. Further, the cassette cover 114 is protruded in the width direction W from the cassette body 111*b*. The cover member 121 is arranged above the cassette cover 114, and the cassette cover 114 also constitutes a part of the exterior of the printer 1. That is, in a state where the cassette 111 is attached to the apparatus body A, the cover member 121 and the cassette cover 114 are aligned in a vertical direction VD.

Further, in a state where the cover member 121 is closed and the cassette 111 is attached to the apparatus body A, the cover member 121 and the cassette cover 114 of the cassette 111 are flush.

The left cover 602 constituting a part of the exterior of the printer 1 is disposed on a left side surface of the apparatus body A. More specifically, the left cover 602 serving as a side cover constitutes one side surface in the width direction W of the exterior of the printer 1. Further, the apparatus body A includes a front cover 601 that faces an upstream side in the attaching direction AD as illustrated in FIG. 2B, and the front cover 601 serving as a body portion is disposed successively to the left cover 602. As described, the apparatus body A includes a plurality of covers that constitute the exterior of the printer 1, and a pair of side panels 101 (refer to FIG. 3A) serving as a frame that is covered by the plurality of covers. The pair of side panels 101 is arranged parallelly in the width direction W, and supports the process cartridge B in a detachably attached manner. Further, the cover member 121 covers a part of the front cover 601 in a state closed with respect to the apparatus body A. The above-mentioned cover member 121 and cassette cover 114 are arranged upstream of the front cover 601 in the attaching direction AD. An air intake port 603 described later is provided on the front cover 601. The air intake port 603 includes a plurality of holes. Further, the left cover 602 includes a vertical surface 602*b*, and an inclined surface 602*a* that is disposed below the vertical surface 602*b* and that is inclined with respect to the width direction W and the vertical direction VD. The vertical surface 602*b* is not provided with an air intake port, and the inclined surface 602*a* is provided with an auxiliary air intake port 615 serving as another air intake port. The auxiliary air intake port 615 includes a plurality of holes.

According to the above-mentioned series of image forming processes, the apparatus body A and the process cartridge B may include some parts that have raised temperatures caused by heat generation. For example, vicinities of the fixing portion 4, an electrical substrate 611 (refer to FIG. 3A), and the cleaning blade 306 of the process cartridge B may generate heat. In the fixing portion 4, the heating unit 4*b* equipped with a heater generates heat, by which the temperature around the fixing portion 4 rises. The cleaning blade 306 generates heat by friction with the photosensitive drum 302, by which the temperature around the process cartridge B rises.

As described, in the areas where temperature rises, an upper limit temperature is set for maintaining printing quality and stable operation and for the safety of users. In the present embodiment, the blower fan 612 serving as an air blowing portion is provided so that the upper limit temperature is not exceeded.

As illustrated in FIGS. 3A, 3B, and 4, the blower fan 612 is provided in an inner side of the apparatus body A. The blower fan 612 is arranged on a front left corner of the apparatus body A surrounded by the left cover 602 and the front cover 601. In other words, the blower fan 612 is arranged on a first side of the apparatus body A in the width direction W and on an upstream side of the apparatus body A in the attaching direction AD.

The blower fan 612 according to the present embodiment is an axial fan whose air intake direction illustrated by the solid line arrow of FIG. 4 and an air discharge direction illustrated by the broken line arrow of FIG. 4 are the same. The blower fan 612 includes a blade member 612*a* rotatable about a rotational axis RA, and generates airflow by the rotation of the blade member 612*a* serving as a rotary member. The blower fan 612 takes in and discharges air along the rotational axis RA. The air taken in by the blower fan 612 through the air intake port 603 described later reaches the blower fan 612 directly. Meanwhile, the air taken in through the auxiliary air intake port 615 is guided to the blower fan 612 through a duct portion 616.

As illustrated in FIGS. 3A and 3B, a duct member 613 that guides the air discharged from the blower fan 612 toward a cooling target is disposed in the vicinity of the blower fan 612 in the apparatus body A. The blower fan 612 takes in outer air as illustrated by the solid lines of FIGS. 3A and 3B and FIG. 6, and blows the air toward each cooling target through the duct member 613 as illustrated by the broken lines of FIGS. 3A and 3B and FIG. 6. For example, the blower fan 612 sends air toward the fixing portion 4, the electrical substrate 611, and the process cartridge B serving as cooling targets. Thereby, a plurality of cooling targets may be cooled by one blower fan 612.

The electrical substrate 611 is a substrate on which electrical components are mounted. The electrical substrate 611 is engaged to the side panel 101 through cutouts and screws not shown, and is supported by the side panel 101. The electrical substrate 611 is arranged between the side panel 101 and the left cover 602. On the electrical substrate 611 are mounted a power supply circuit for generating a predetermined DC voltage from a commercial AC power supply, a high voltage power supply circuit for generating a high voltage necessary for forming images, and a control circuit for controlling various operations of the printer 1. The electrical substrate 611 is a single-sided board, wherein a surface being opposed to the side panel 101 is a solder surface on which surface mounted components are mounted, and the surface opposite to the surface being opposed to the side panel 101 is a component surface on which lead components are mounted. In the electrical substrate 611, the heat generating components serving as the cooling targets are mounted on both the component surface side and the solder surface side. For example, lead components 103, 104, and 105 are mounted on the component surface side of the electrical substrate 611. The lead components 103, 104, and 105 are parts of the capacitor and resistor elements, which are examples of heat generating components.

Further, a fan holder 614 serving as a holder for supporting the blower fan 612 is provided in the apparatus body A. The blower fan 612 is fixed by the fan holder 614 such that the air intake direction and the air discharge direction are inclined with respect to the attaching direction AD and the width direction W. In other words, the rotational axis RA of the blower fan 612 is inclined with respect to the attaching direction AD and the width direction W, as illustrated in FIG. 6. Further, the rotational axis RA is extended from a first side in the width direction W of the apparatus body A, which is the left side according to the present embodiment, toward a second side, which is the right side according to the present embodiment, toward the downstream side in the attaching direction AD.

As described, by disposing the blower fan 612 in an inclined manner with respect to the attaching direction AD and the width direction W, the arrangement space of the blower fan 612 in the width direction W may be downsized compared to a case where the rotational axis RA of the blower fan 612 is arranged parallelly with the attaching direction AD. Therefore, the printer 1 may be downsized in the width direction W.

Further, the fan holder 614 includes the duct portion 616 serving as a wall portion, as illustrated in FIGS. 3A and 3B, and the duct portion 616 is arranged between the left cover 602 and the electrical substrate 611 in the width direction W. The duct portion 616 separates the space disposed between the air intake port 603 and the blower fan 612 from the space in which the electrical substrate 611 serving as the substrate is arranged. That is, together with the left cover 602, the duct portion 616 forms an air flow passage of air taken in through the air intake port 603 to the inner side of the apparatus body A and blowing toward the blower fan 612.

As illustrated in FIG. 3B, the duct portion 616 is arranged to be overlapped with the electrical substrate 611 when viewed in the width direction W. In other words, in a state of projection of the duct portion 616 and the electrical substrate 611 in the width direction W, the duct portion 616 and the electrical substrate 611 are overlapped with each other. Therefore, another member may be disposed between the duct portion 616 and the electrical substrate 611. The width direction W is a direction perpendicular to a direction in which the left cover 602 extends.

In the present embodiment, when viewed in the width direction W, a part of the electrical substrate 611 is disposed to be overlapped with the duct portion 616, the blower fan 612, and a holder portion of the fan holder 614. The holder portion is a part that holds the blower fan 612. The broken line of FIG. 3B illustrates some of the elements that are arranged on the electrical substrate 611 and the electrical substrate 611 and that are hidden on the rear side of the blower fan 612 and the fan holder 614.

The duct portion 616 includes a horizontal wall portion 617 that extends along the attaching direction AD, and a horizontal wall portion 618 that rises from the horizontal wall portion 617 toward the left cover 602 (refer to FIG. 2A). The electrical substrate 611 is equipped with the lead components 103, 104, and 105, which are elements having high heights, and the horizontal wall portion 617 has a shifted shape such that it is spaced apart from the electrical substrate 611 in the width direction W so as to avoid the lead components 103, 104, and 105. In the present embodiment, the horizontal wall portion 617 adopts a stepped shape having a stepped portion. The horizontal wall portion 617 is spaced apart from the left cover 602 in the width direction W in the area where the lead components 103, 104, and 105 are not present, such that a large air flow passage through which air flows may be provided.

The air taken in through the air intake port 603 and the auxiliary air intake port 615 and discharged through the blower fan 612 passes the vicinity of the electrical substrate 611 where temperature rises by heat generation. However, the air flow passage through which outer air passes toward the blower fan 612 is separated by the horizontal wall portion 617 and the horizontal wall portion 618 of the duct portion 616 from the space in which the electrical substrate 611 is disposed, such that it is not easily affected by the rising of temperature caused by the heat generated by the electrical substrate 611. Further, the air being taken in is guided by the horizontal wall portion 617 toward the blower fan 612, and leakage thereof to the space in which the electrical substrate 611 is disposed is suppressed. Therefore, the cooling target may be cooled efficiently by the airflow generated by the blower fan 612.

In the present embodiment, the duct portion 616 is formed integrally with the fan holder 614, but the present technique is not limited thereto. For example, the duct portion 616 may be disposed as a separate member from the fan holder 614. Further, the duct member 613 may be formed integrally with or separately from the fan holder 614.

Arrangement of Air Intake Port

Next, the arrangement of the air intake port 603 will be described with reference to FIGS. 2A to 6B. FIG. 5A is a front view illustrating the printer 1, and FIG. 5B is a front view of the printer 1 in which a part of the cover member 121 and the cassette cover 114 is cut out. That is, FIGS. 5A and 5B are each a view of the printer 1 viewed in the attaching direction AD.

As illustrated in FIGS. 5A and 5B, the air intake port 603 disposed on the front cover 601 is arranged to be overlapped with the cover member 121 and the cassette cover 114 when viewed in the attaching direction AD in a state where the cassette 111 is attached to the apparatus body A. As illustrated in FIGS. 3A, 5A, 5B, and 6, in a state where the cassette 111 is attached to the apparatus body A, the air intake port 603 is covered by the cover member 121 and the cassette cover 114 with a gap GP formed therebetween.

Therefore, in a state where the cover member 121 is opened, the air intake port 603 may be visually confirmed when viewed in the attaching direction AD. Further, in a state where the cassette 111 is removed from the apparatus body A, the air intake port 603 may be visually confirmed when viewed in the attaching direction AD. Meanwhile, in a state where the cover member 121 is closed and the cassette 111 is attached to the apparatus body A, the air intake port 603 may not be visually confirmed when viewed in the attaching direction AD. By arranging the air intake port 603 in this manner, the deterioration of appearance property by providing the air intake port 603 may be suppressed. Further, the air intake port 603 may be visually confirmed through the gap GP when viewed obliquely with respect to the attaching direction AD, as illustrated in FIG. 3A.

Further, the air intake port 603 is arranged such that at least a part thereof is overlapped with the blower fan 612 when viewed in the attaching direction AD, as illustrated in FIG. 5B. Further, the area in which the air intake port 603 is disposed has a height of ½ the height of the apparatus body A in the vertical direction VD or more. More preferably, the area in which the air intake port 603 is disposed has a height of ⅔ the height of the apparatus body A in the vertical direction VD or more. In the present embodiment, the air intake port 603 is disposed across approximately the entire height of the apparatus body A. Further, the auxiliary air intake port 615 arranged at a position that differs from that of the air intake port 603 is disposed on the inclined surface 602*a* of the left cover 602. Therefore, the blower fan 612 may take in sufficient air through the air intake port 603 and efficiently cool the cooling targets within the apparatus body A.

Then, as illustrated in FIG. 6, outer air enters through the gap GP between the cover member 121, the cassette cover 114, and the front cover 601 to the air intake port 603. The outer air taken into the apparatus body A through the air intake port 603 and the auxiliary air intake port 615 is guided by the duct portion 616 toward the blower fan 612 while suppressing the influence of rising of temperature by the heat generated in the electrical substrate 611. Then, the outer air taken into the apparatus body A is blown by the blower fan 612 through the duct member 613 toward the cooling targets.

As described above, the air intake port 603 that is overlapped with the cover member 121 and the cassette cover 114 in the attaching direction AD and that is relatively large in the vertical direction is disposed on the front cover 601 of the printer 1. Therefore, sufficient air may be taken in through the air intake port 603, and the cooling targets within the apparatus body A may be cooled efficiently. The auxiliary air intake port 615 is additionally provided on the inclined surface 602*a* of the left cover 602, such that the air intake ability may be enhanced further.

The air intake port 603 is covered by the cover member 121 and the cassette cover 114 with a gap GP formed therebetween in the attaching direction AD, such that it may not be visually confirmed when viewed in the attaching direction AD. Therefore, the influence of providing the air intake port 603 on the appearance may be suppressed. Further, the auxiliary air intake port 615 is disposed on the inclined surface 602*a* at the lower end portion of the left cover 602 and facing obliquely downward in the left direction, such that it has little influence on the appearance property. Therefore, the air intake ability may be ensured without deteriorating the appearance property.

Since the air intake port is not disposed on the vertical surface 602*b* of the left cover 602 that opposes the blower fan 612 in the width direction W, the operation noise of the blower fan 612 may be shielded by the left cover 602, and the operation noise may be reduced. Further, even when the printer 1 is downsized, a relatively large air intake port 603 may be disposed at a position that may not be visually confirmed when viewed in the attaching direction AD, such that the freedom of design may be enhanced.

Modified Example of First Embodiment

Figure 7A:
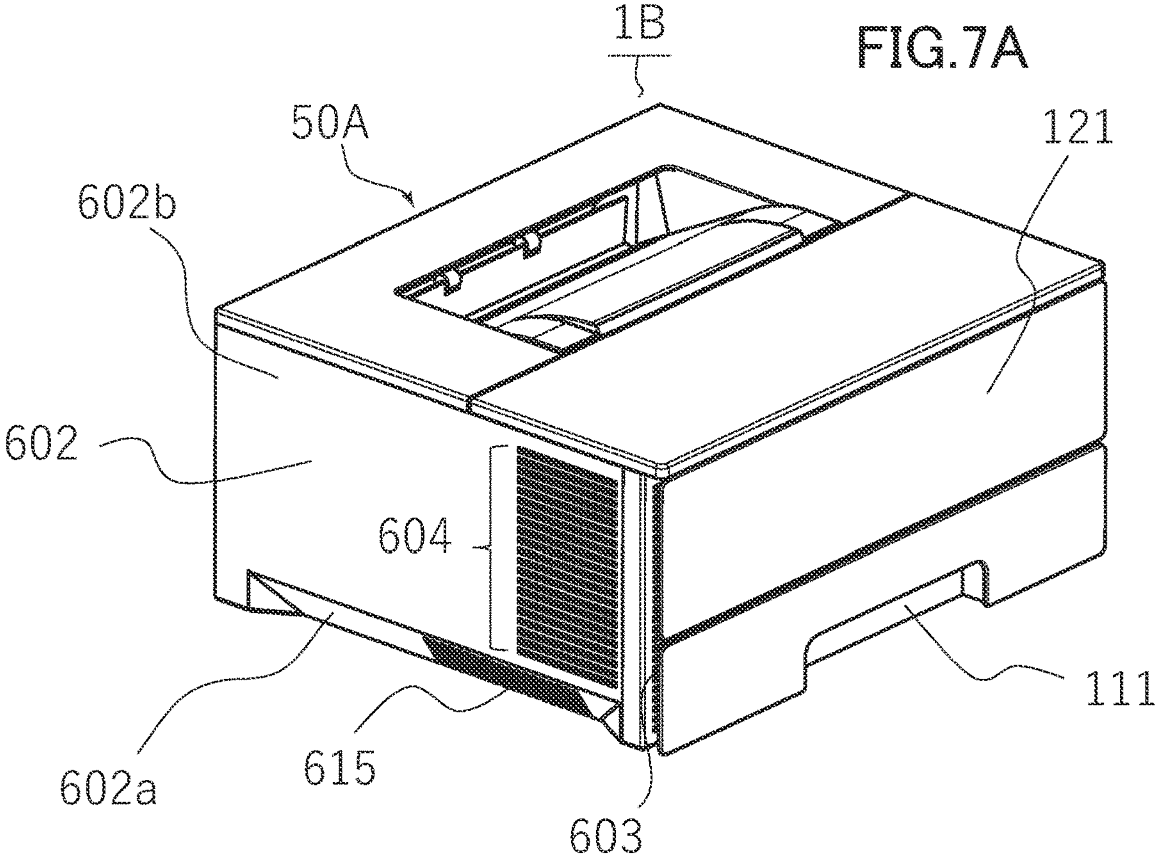
FIG. 7A is a perspective view of a printer according to a modified example of the first embodiment with a cover member closed and a cassette being attached to an apparatus body.
Figure 7B:
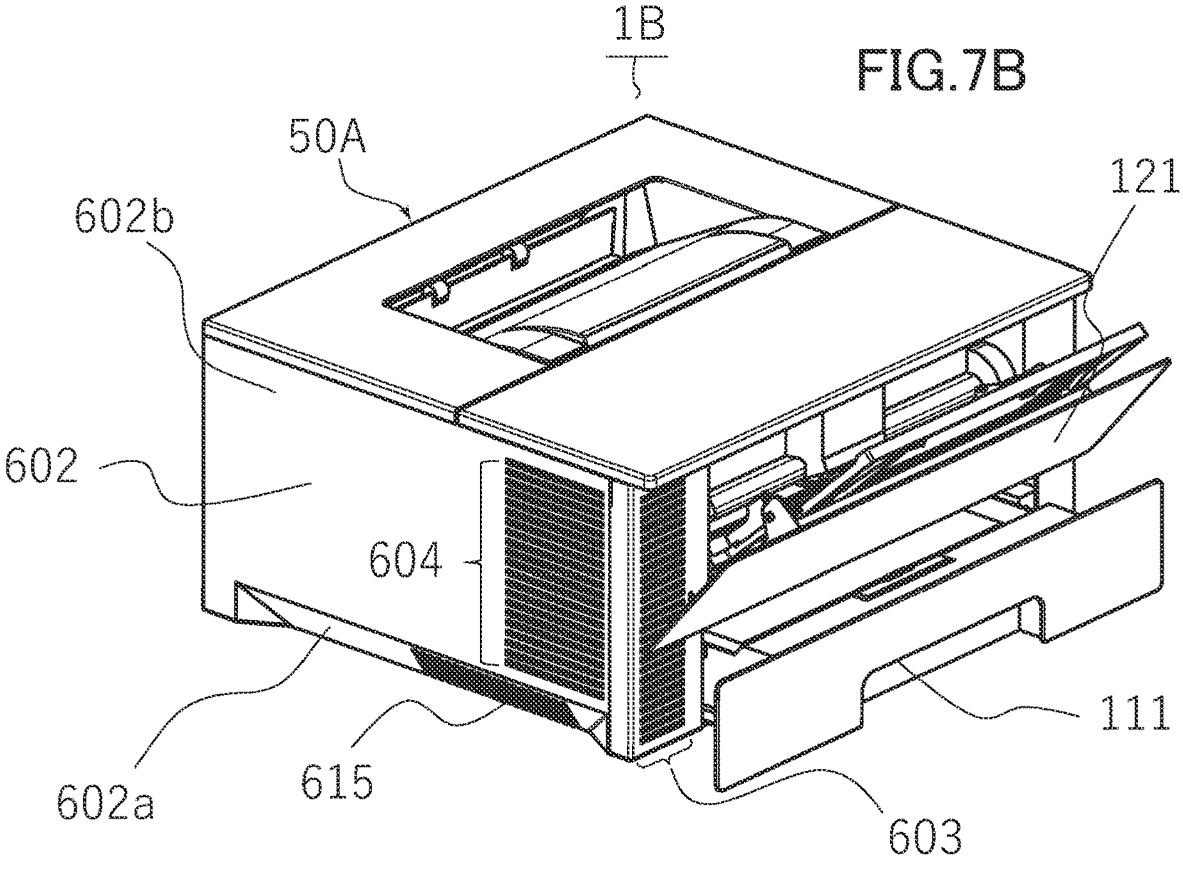
FIG. 7B is a perspective view of the printer with the cover member opened and the cassette being drawn out of the apparatus body.

FIG. 7A is a perspective view illustrating a printer 1B according to a modified example of the first embodiment, and FIG. 7B is a perspective view illustrating the printer 1B in a state where the cover member 121 is opened and the cassette 111 is drawn out of an apparatus body 50A. According to the first embodiment described with reference to FIGS. 1 to 6, the air intake port was not disposed on the vertical surface 602*b* of the left cover 602, but according to the modified example illustrated in FIGS. 7A and 7B, an air intake port 604 is disposed on the vertical surface 602*b*.

In a state where the influence of the heat generating portion within the apparatus body 50A is great, the air intake port 604 may be disposed on the left cover 602 if the influence thereof on the exterior is permissible. Thereby, the amount of air being taken in may be increased by taking in air through the air intake port 604 in addition to the air intake port 603 and the auxiliary air intake port 615, such that the cooling ability may be improved.

It is ideal that the air intake port 604 is formed to cover a range as large as possible from the viewpoint of increasing the air taken in through the air intake port 604. In the present modified example, the air intake port 604 is formed to cover a range that is greater than the projected area of the blower fan 612 (refer to FIG. 3A). Further, the air intake port 604 is arranged so as to be overlapped with the duct portion 616 (refer to FIG. 3B) when viewed in the width direction W.

In the present modified example, the air intake port 603 and the auxiliary air intake port 615 may be omitted.

Second Embodiment

Next, a second embodiment according to the present technique will be described, wherein the second embodiment adopts a configuration in which the structure of the blower fan 612 according to the first embodiment is varied. Therefore, the same configurations as those of the first embodiment are either not shown in the drawings or denoted with the same reference numbers.

Figure 8A:
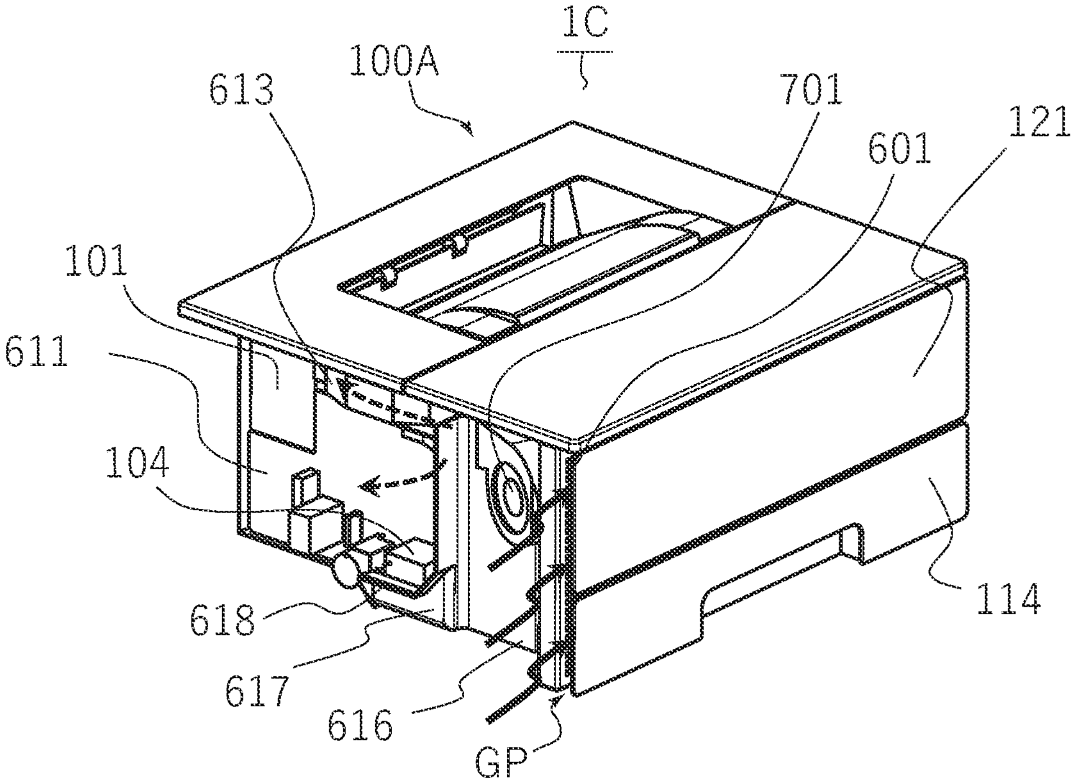
FIG. 8A is a perspective view illustrating a printer according to a second embodiment with a left cover removed.
Figure 8B:
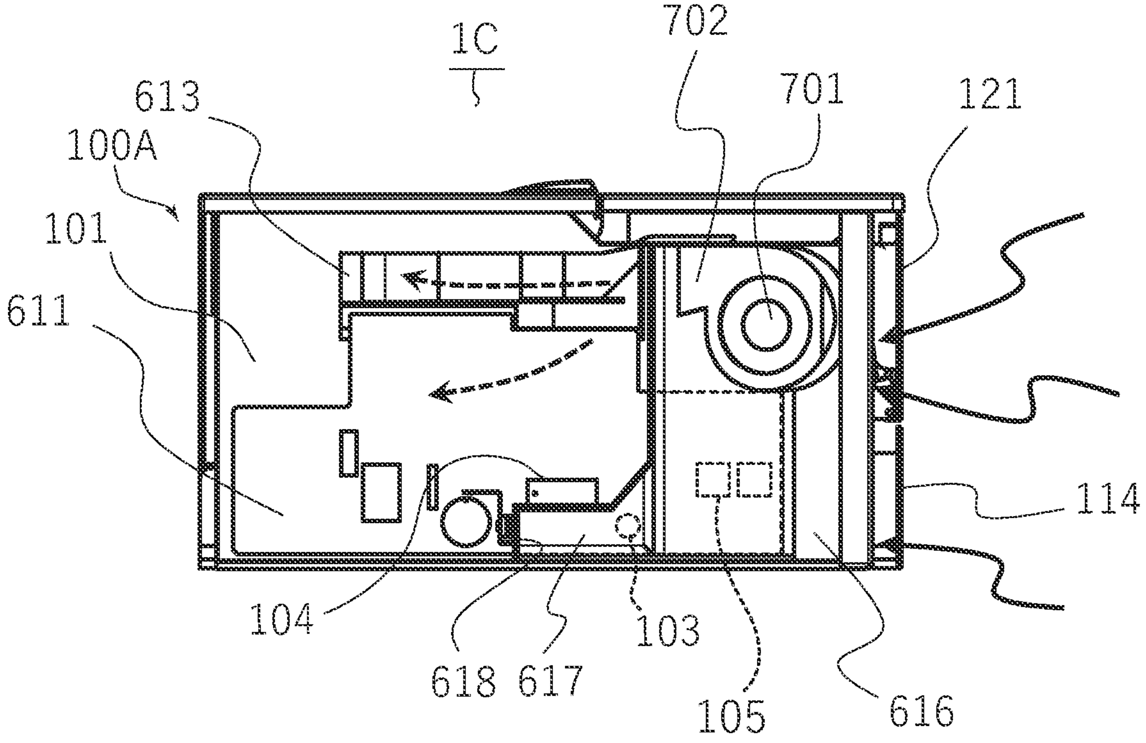
FIG. 8B is a side view illustrating the printer with the left cover removed.
Figure 9:
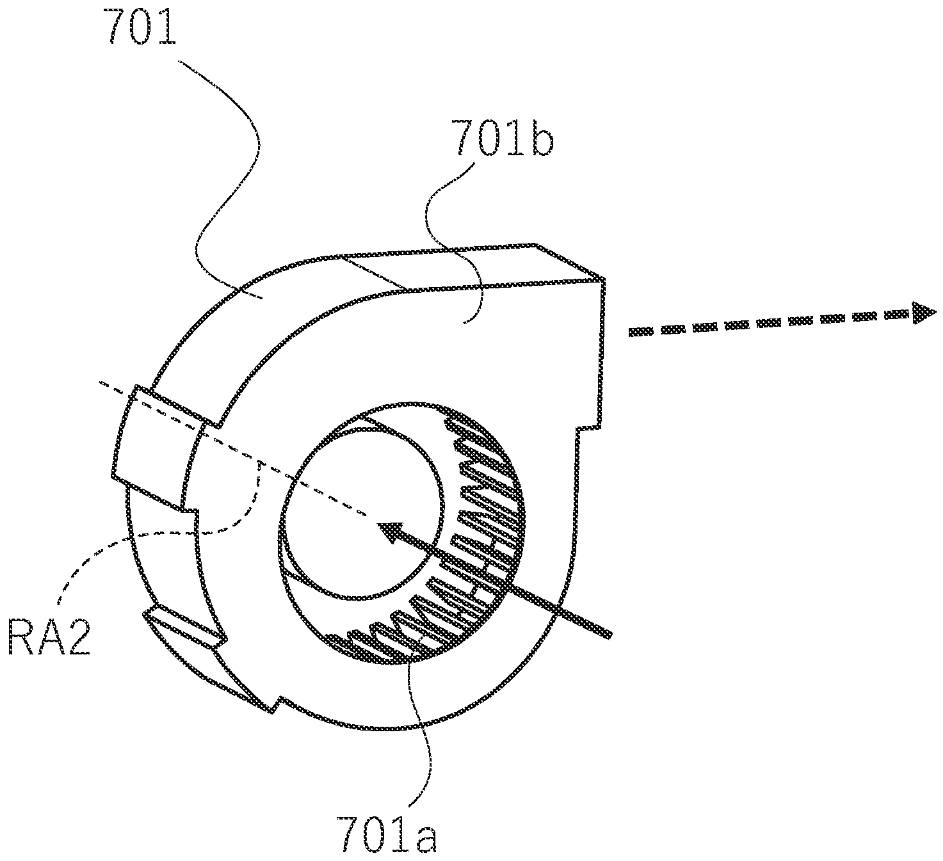
FIG. 9 is a perspective view illustrating a blower fan.
Figure 10:
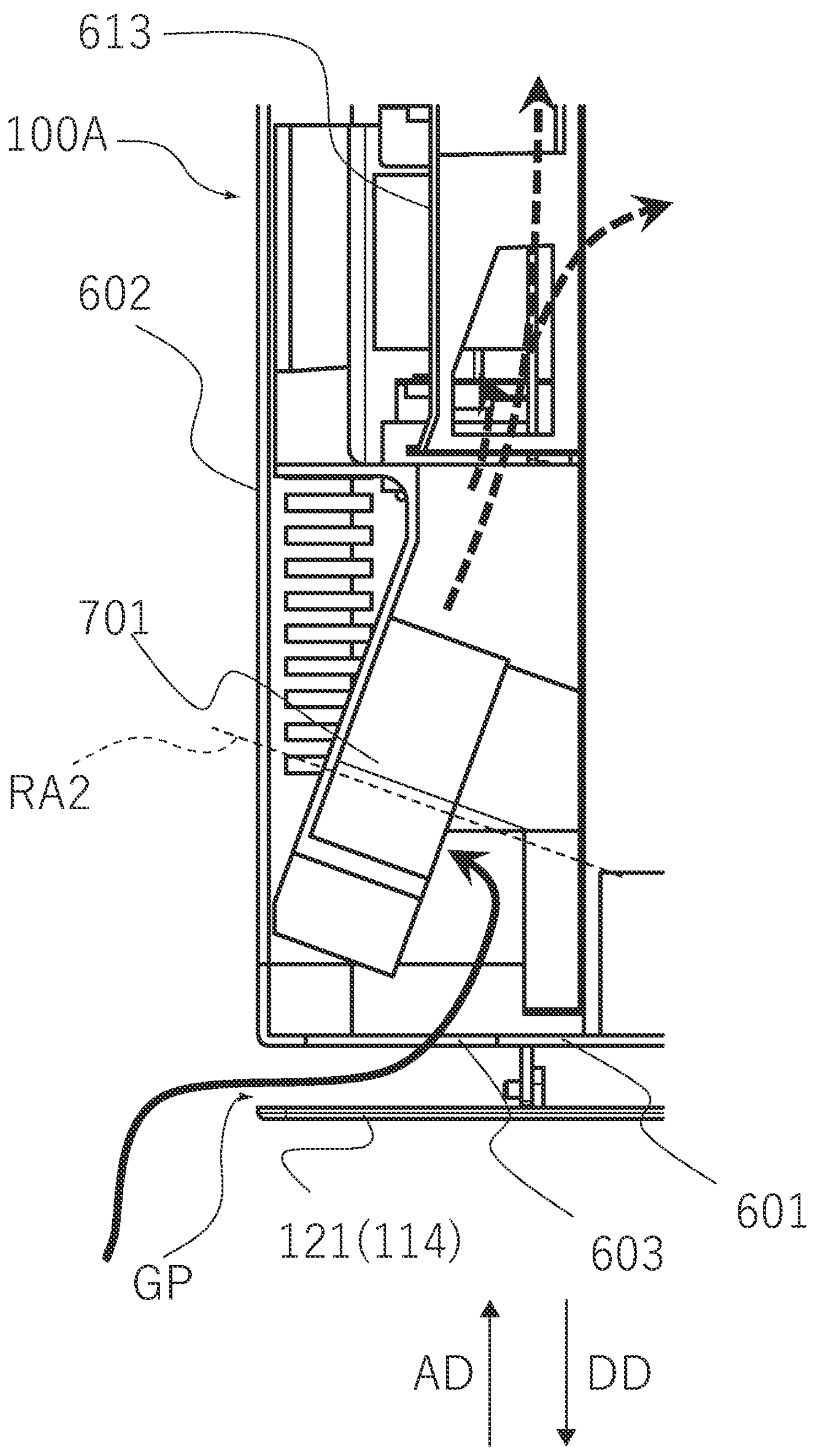
FIG. 10 is a cross-sectional view illustrating a cross section that is parallel to a horizontal direction of the apparatus body.
Figure 11:
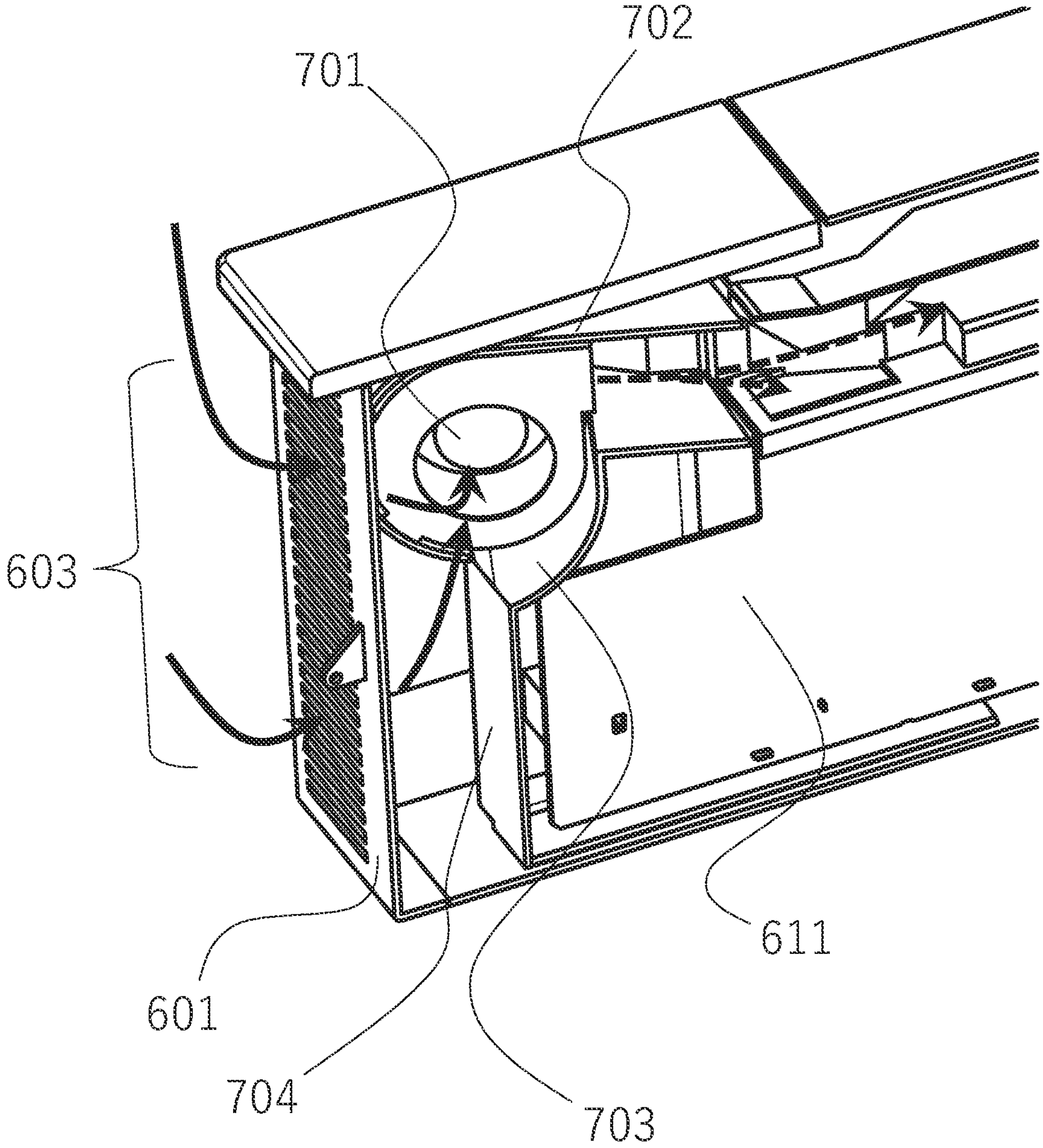
FIG. 11 is a perspective view illustrating a blower fan from an upper right side of the printer.

FIG. 8A is a perspective view illustrating a printer 1C with the left cover 602 (refer to FIG. 2A) removed, and FIG. 8B is a side view illustrating the printer 1C with the left cover 602 removed. FIG. 9 is a perspective view illustrating a blower fan 701. FIG. 10 is a cross-sectional view illustrating a cross-section that is parallel to a horizontal direction of an apparatus body 100A. FIG. 11 is a perspective view of the blower fan 701 viewed from the upper right side of the printer 1C. In FIGS. 8A to 11 excluding FIG. 9, blades of the blower fan 701 are not shown for simplification.

As illustrated in FIGS. 8A, 8B, and 9, the blower fan 701 serving as an air blowing portion is disposed on an inner side of the apparatus body 100A of the printer 1C according to the second embodiment. The blower fan 701 is arranged on a front left corner of the apparatus body 100A surrounded by the left cover 602 and the front cover 601. In other words, the blower fan 701 is arranged on a first side of the apparatus body 100A in the width direction W and on an upstream side of the apparatus body 100A in the attaching direction AD.

The blower fan 701 according to the present embodiment is a centrifugal fan whose air intake direction illustrated by the solid line arrow of FIG. 9 and an air discharge direction illustrated by the broken line arrow of FIG. 9 intersect. The centrifugal fan is characterized in that it has a strong directivity compared to the axial fan and that the cooling target may be easily targeted.

The blower fan 701 includes a blade member 701*a* that is rotatable about a rotational axis RA2, and a duct 701*b*, wherein airflow is generated by the blade member 701*a* serving as a rotary member being rotated. The blower fan 701 takes in air along the rotational axis RA2, and discharges air through the duct 701*b* in a direction intersecting the rotational axis RA2.

The blower fan 701 takes in outer air as illustrated by the solid lines of FIGS. 8A, 8B, 10, and 11, and sends air toward the cooling targets through the duct member 613 as illustrated by the broken lines of FIGS. 8A, 8B, 10, and 11. For example, the blower fan 701 sends air to the fixing portion 4, the electrical substrate 611, and the process cartridge B as cooling targets. Thereby, a plurality of cooling targets may be cooled by a single blower fan 701.

Further, a fan holder 702 that supports the blower fan 701 is disposed on the apparatus body 100A. The blower fan 701 is fixed by the fan holder 702 such that the air intake direction and the air discharge direction are inclined with respect to the attaching direction AD and the width direction W. In other words, the rotational axis RA2 of the blower fan 701 is inclined with respect to the attaching direction AD and the width direction W, as illustrated in FIG. 10. Further, the rotational axis RA2 is extended from a second side in the width direction W of the apparatus body 100A, which is the right side according to the present embodiment, toward a first side, which is the left side according to the present embodiment, toward the downstream side in the attaching direction AD. The rotational axis RA2 of the blower fan 701 may also be inclined in the up-down direction in addition to the attaching direction AD and the width direction W.

As described, by disposing the blower fan 701 in an inclined manner with respect to the attaching direction AD and the width direction W, the arrangement space of the blower fan 701 in the width direction W may be downsized compared to a case where the rotational axis RA2 of the blower fan 701 is arranged parallelly with the attaching direction AD. Therefore, the printer 1C may be downsized in the width direction W.

Further, the fan holder 702 includes wall portions 703 and 704, as illustrated in FIG. 11, and the wall portions 703 and 704 separate the space disposed between the air intake port 603 and the blower fan 701 from the space in which the electrical substrate 611 is arranged. Similar to the first embodiment, the fan holder 702 is provided with the duct portion 616 illustrated in FIGS. 8A and 8B. Therefore, the air flow passage through which outer air flows toward the blower fan 701 is separated by the duct portion 616 and the wall portions 703 and 704 from the space in which the electrical substrate 611 is installed, such that it is not easily affected by the rising of temperature caused by the heat generated from the electrical substrate 611. Therefore, the cooling target may be cooled efficiently by the airflow generated by the blower fan 701.

The arrangement of the air intake port 603 according to the present embodiment is similar to that of the first embodiment. That is, as illustrated in FIGS. 8A and 8B, the air intake port 603 disposed on the front cover 601 is arranged so as to be overlapped with the cover member 121 and the cassette cover 114 when viewed in the attaching direction AD in a state where the cassette 111 is attached to the apparatus body 100A. Further, in a state where the cassette 111 is attached to the apparatus body 100A, the air intake port 603 is covered by the cover member 121 and the cassette cover 114 with the gap GP formed therebetween. By disposing the air intake port 603 in this manner, the deterioration of appearance property caused by providing the air intake port 603 may be suppressed.

Then, as illustrated in FIG. 10, outer air is taken in through the gap GP formed between the cover member 121 and cassette cover 114 and the front cover 601 into the air intake port 603. The outer air having entered the apparatus body 100A through the air intake port 603 and the auxiliary air intake port 615 is guided toward the blower fan 612 while having the influence of temperature rise caused by the heat generated by the electrical substrate 611 being suppressed by the duct portion 616. Then, the outer air having entered the apparatus body A is blown by the blower fan 701 via the duct member 613 toward the cooling targets.

As described, the air intake port 603 that is overlapped with the cover member 121 and the cassette cover 114 in the attaching direction AD and that is relatively large in the vertical direction is provided on the front cover 601 of the printer 1C. Therefore, by having the blade member 701*a* of the blower fan 701 rotate, sufficient air may be taken in through the air intake port 603, and the cooling targets within the apparatus body 100A may be cooled efficiently.

Third Embodiment

Next, a third embodiment according to the present technique will be described, wherein the third embodiment adopts a configuration in which an air flow path of a modified example of the first embodiment (refer to FIGS. 7A and 7B) has been varied. Therefore, the same configurations as those of the modified example of the first embodiment are either not shown in the drawings or denoted with the same reference numbers.

Figure 12A:
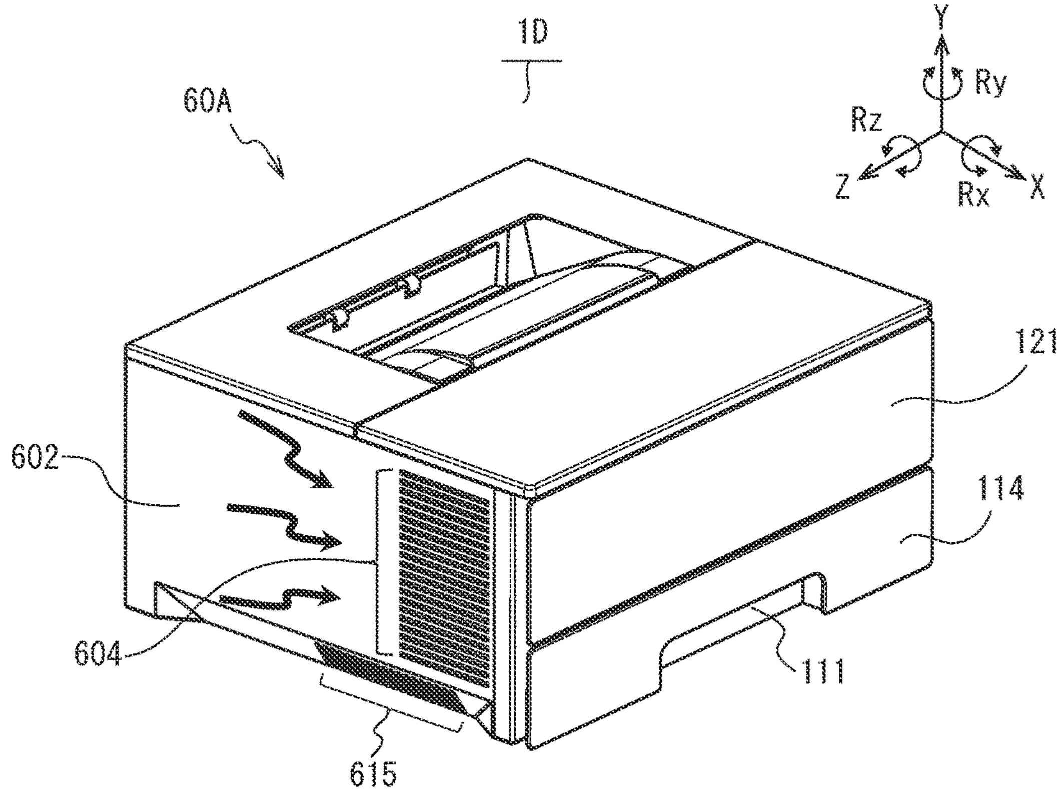
FIG. 12A is a perspective view illustrating a printer according to a third embodiment.

As illustrated in FIG. 12A, a printer 1D serving as an image forming apparatus according to the third embodiment includes an apparatus body 60A having an approximately rectangular parallelopiped shape, and the cassette 111 that serves as a sheet storage portion for storing sheets P and that may be drawn out of and attached to the apparatus body 60A. Further, the cover member 121 is supported in an openable and closable manner on a frame of the apparatus body 60A.

The inserting and extracting direction of the cassette 111 is set as a front-rear direction of the printer 1D, and an upstream side in the inserting and extracting direction is set as a front side of the printer 1D. In the following description, an upper direction in an up-down direction, i.e., vertical direction, in a state where the printer 1D is installed on a horizontal plane is referred to as a Y direction, and a lower direction in the up-down direction is referred to as a –Y direction. In a horizontal direction orthogonal to the Y direction, the direction along one side of the apparatus body 60A of the printer 1D is referred to as a Z direction, and a direction orthogonal to the Z direction is referred to as an X direction. That is, the X direction, the Y direction, and the Z direction are mutually orthogonal.

In the present embodiment, the Z direction is a direction from the right side toward the left side when viewed from the front side of the printer 1D, and the direction opposite thereto is referred to as a –Z direction. Further, the X direction is a direction from the rear side toward the front side of the printer 1D, and the direction opposite thereto is referred to as a –X direction. Further, unless denoted otherwise, units and components assembled to the printer 1D are described with reference to X, Y, and Z directions based on the direction in which they are assembled.

As illustrated in FIG. 12A, the printer 1D includes the apparatus body 60A having an approximately rectangular parallelopiped shape. The apparatus body 60A includes a frame constituting a frame body of the printer 1D, and a front door, an upper cover, the left cover 602, and a rear cover serving as exterior surfaces covering the frame. Further, the cassette cover 114 of the cassette 111 attached in a drawable manner to a lower portion of the apparatus body 60A also constitutes a part of an exterior of the apparatus body 60A. The apparatus body 60A stores the process cartridge B (refer to FIG. 1) on the inner side thereof.

Figure 12B:
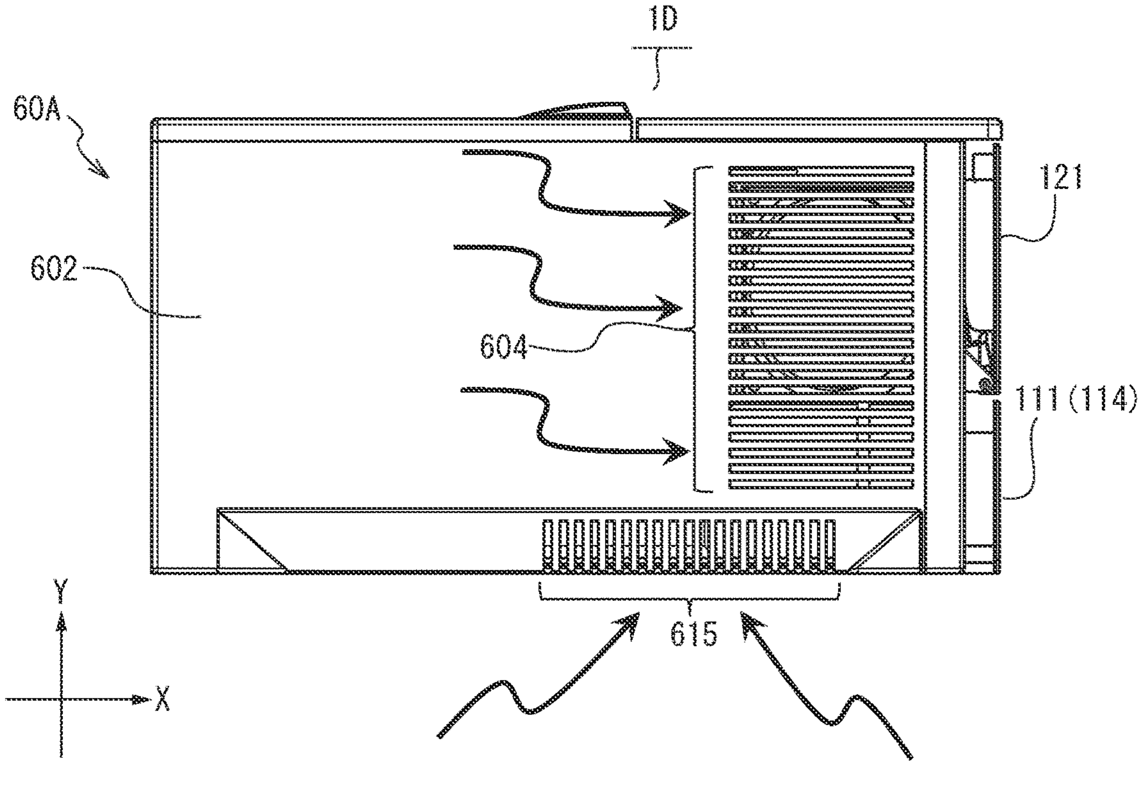
FIG. 12B is a side view illustrating the printer.

FIG. 12B is a side view of a state in which the printer 1D is viewed in the –Z direction. The left cover 602 is provided with the air intake port 604 and the auxiliary air intake port 615. The air intake port 604 and the auxiliary air intake port 615 are supply ports through which air is supplied from the outer side to the inner side of the apparatus body 60A.

Relationship Between Fan and Substrate

Figure 13A:
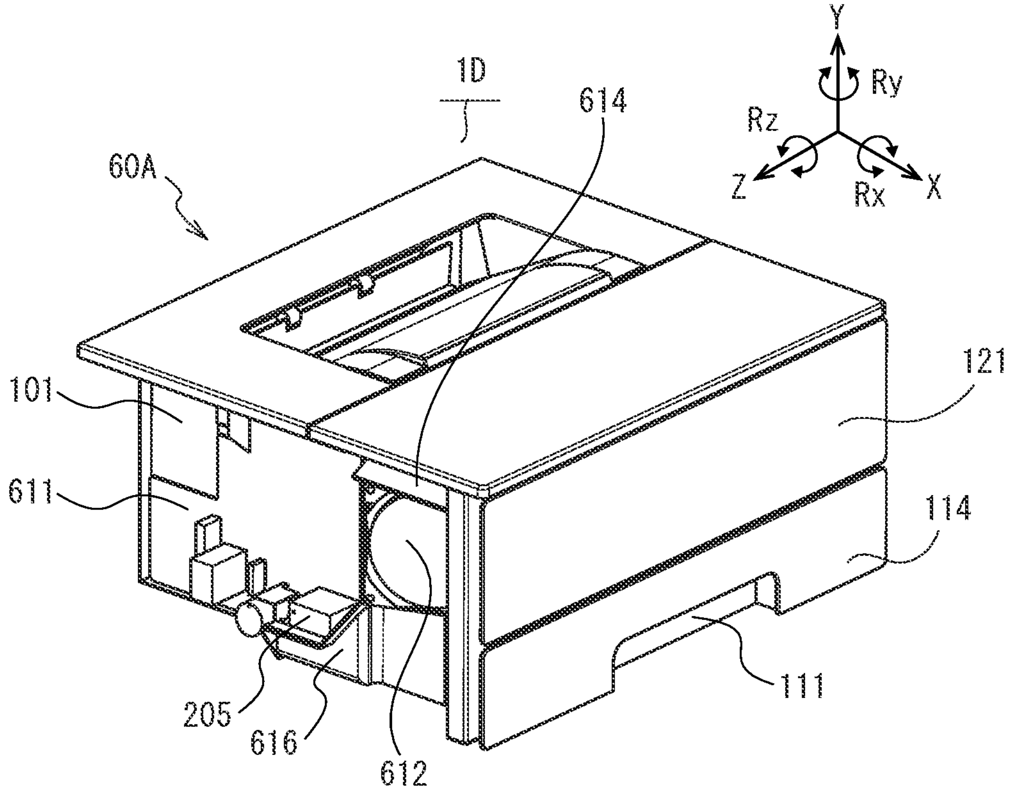
FIG. 13A is a perspective view illustrating the printer with a left cover removed.
Figure 13B:
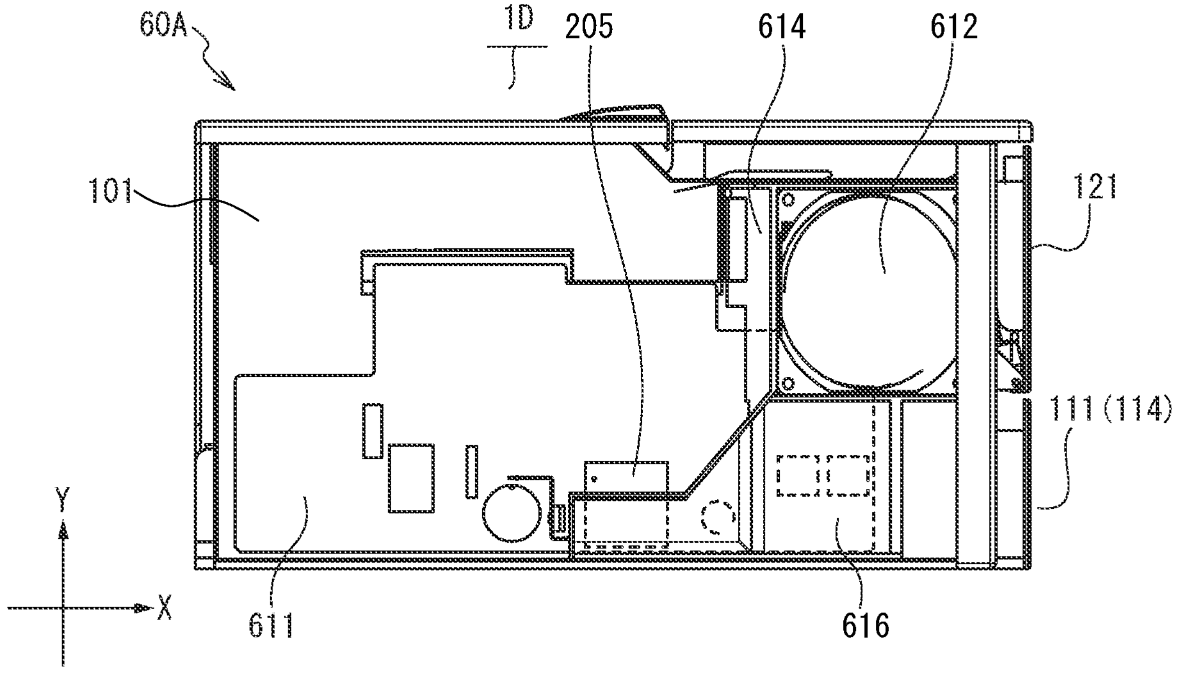
FIG. 13B is a side view illustrating the printer with the left cover removed.

FIG. 13A is a perspective view with the left cover 602 removed from FIG. 12A. FIG. 13B is a side view with the left cover 602 removed from FIG. 12B.

As illustrated in FIGS. 12A to 13B, the air taken in through the air intake port 604 by the blower fan 612 directly reaches the blower fan 612. Meanwhile, the air taken in through the auxiliary air intake port 615 reaches the blower fan 612 through the duct portion 616. As illustrated in FIGS. 13A and 13B, a part of the duct portion 616 and the electrical substrate 611 are overlapped when viewed in the Z direction.

Further, a part of the electrical substrate 611 is arranged to be overlapped with the blower fan 612 when viewed in the width direction W.

Figure 14A:
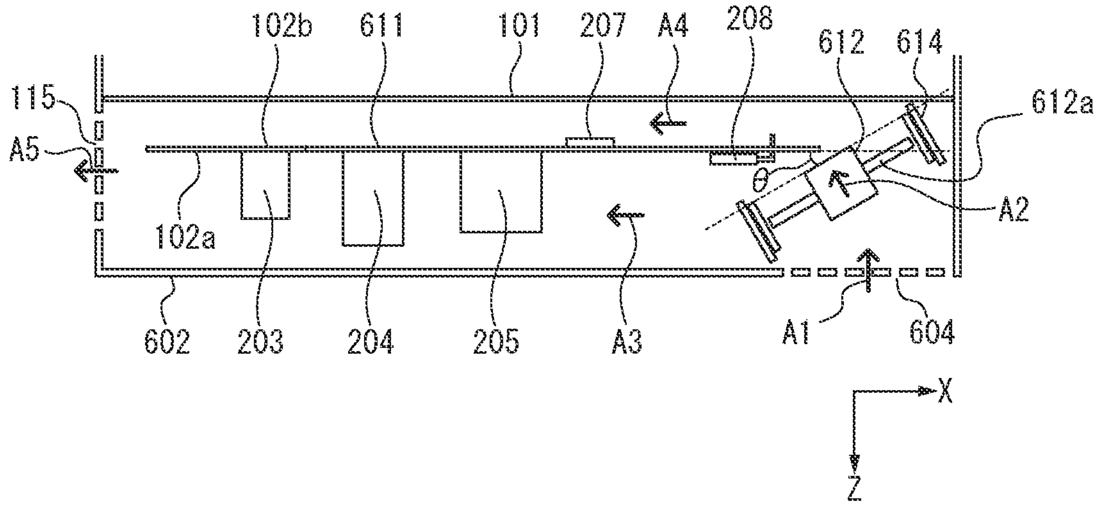
FIG. 14A is a cross-sectional view illustrating a left side portion of the printer.
Figure 14B:
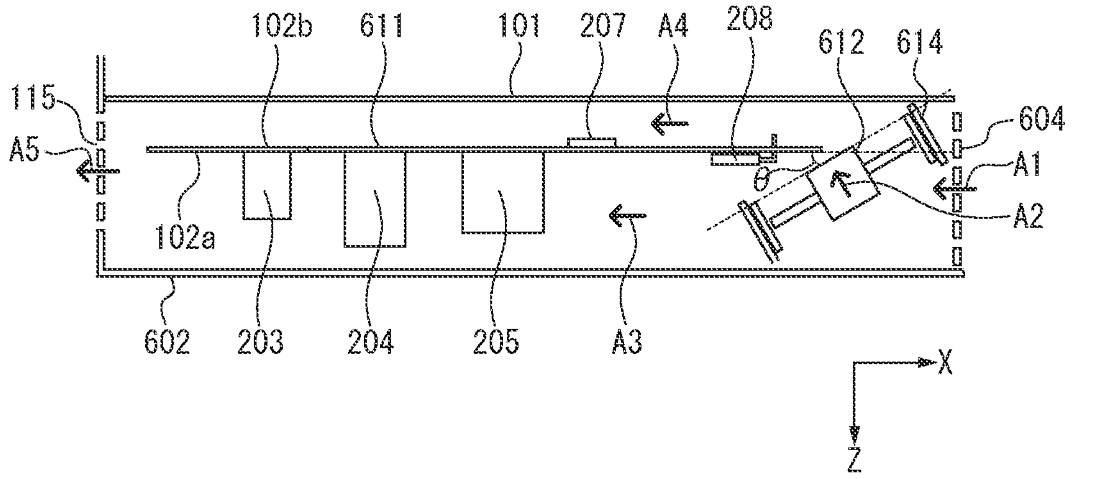
FIG. 14B is a cross-sectional view illustrating a modified example of an air intake port.

In the embodiment, the blower fan 612 is fixed and supported by the fan holder 614, and the blower fan 612 illustrated in the present embodiment is inclined such that the air blowing direction is oriented toward the inner side of the apparatus body. FIGS. 14A and 14B are cross-sectional views in which a left side portion of the printer 1D is viewed in the −Y direction, and the blower fan 612 is inclined with respect to the electrical substrate 611 that extends in the X direction. As illustrated in FIG. 14A, the blower fan 612 is arranged on the first end side of the electrical substrate 611 in the X direction, and an air discharge port 115 for discharging air is disposed on the second end side.

The electrical substrate 611 is engaged to the side panel 101 through a raised portion (not shown) and screws (not shown) disposed on the side panel 101 on the left side. On the electrical substrate 611 are mounted a power supply circuit for generating a predetermined DC voltage from a commercial AC power supply, a high voltage power supply circuit for generating a high voltage necessary for forming images, and a control circuit for controlling various operations of the printer 1D.

The electrical substrate 611 is a single-sided board, wherein a surface being opposed to the side panel 101 is a solder surface 102*b* on which surface mounted components are mounted, and the surface opposite to the surface being opposed to the side panel 101 is a component surface 102*a* on which lead components are mounted. In the present embodiment, the electrical substrate 611 is retained on the side panel 101 such that the component surface 102*a* which is the surface opposed to the left cover 602 serves as a first surface, and the solder surface 102*b* which is the surface opposite to the component surface 102*a* in the Z direction is disposed to oppose to the side panel 101. In the present embodiment, the positional relationship where the component surface 102*a* and the left cover 602 are opposed to each other includes a configuration where they are directly opposed to each other and a configuration where they are opposed with some member interposed therebetween. Similarly, the positional relationship where the solder surface 102*b* and the left cover 602 are opposed to each other includes a configuration where they are directly opposed to each other and a configuration where they are opposed with some member interposed therebetween. The side panel 101 is made of a sheet metal, and it is provided with a function for electrically grounding the electrical substrate 611.

Heat generating components serving as cooling targets are mounted on both the component surface 102*a* side and the solder surface 102*b* side. Lead components 203, 204, and 205 are mounted on the component surface 102*a* side of the electrical substrate 611, and the lead components 203, 204, and 205 serving as first heat generating components are examples of heat generating components such as a capacitor and a resistor element. As illustrated in FIGS. 13A and 13B, the duct portion 616 is disposed so as to overlap with the lead component 205 when viewed in the Z direction. The fan holder 614 is retained by a folding portion that is disposed on upper and lower portions of the side panel 101.

Figure 15:
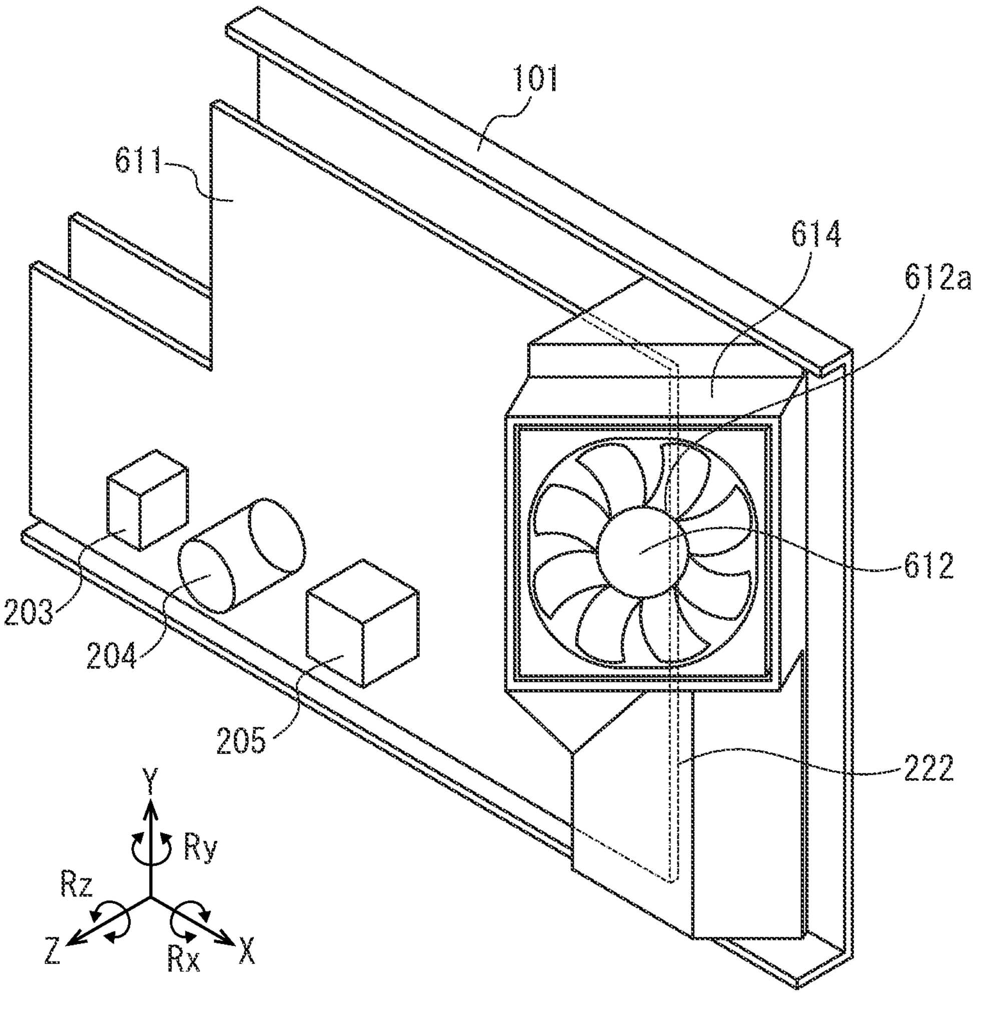
FIG. 15 is a perspective view illustrating an electrical substrate and a blower fan.

The blower fan 612 has upper and lower surfaces in the Y direction and left and right sides in the X direction surrounded by the fan holder 614, as illustrated in FIG. 15, and supported by the fan holder 614.

A ventilation surface of the blower fan 612 is arranged with an inclination angle in a direction of rotation Ry with respect to the surface of the electrical substrate 611. In other words, the rotational axis of the blade member 612*a* of the blower fan 612 is inclined with respect to a component surface 120*a* of the electrical substrate 611. Further, a ventilation surface of the blower fan 612 may have an inclination angle in a direction of rotation Rx and a direction of rotation Rz in addition to the inclination angle in the direction of rotation Ry. The airflow generated by the blower fan 612 is used for cooling the heat generating components mounted on the electrical substrate 611.

FIGS. 14A and 14B are cross-sectional views of a left side portion of the printer 1D. A lead component 207 is disposed on the solder surface 102*b* of the electrical substrate 611. The lead component 207 serving as a second heat generating component is, for example, a solder that is soldered onto the solder surface 102*b*. Further, a lead component 208 is disposed on the component surface 102*a* of the electrical substrate 611, and the lead component 208 is arranged in an area where the space in the Z direction of the component surface 102*a* of the electrical substrate 611 is set smaller due to the blower fan 612. This area has a space in the Z direction smaller than the area in which the lead components 203, 204, and 205 are mounted, wherein components may be arranged by mounting components having a low height or components that may be tilted or laid down, such that the substrate area may be utilized efficiently. According to the present embodiment, the air intake port 604 is disposed on a left side surface of the left cover 602, but the present technique is not limited thereto, and it may be arranged anywhere on the exterior surface of the apparatus body 60A. For example, as illustrated in FIG. 14B, the air intake port 604 may be disposed on an end side surface in the X direction of the apparatus body 60A. Further, the air intake port 604 may be disposed on the first cover 601, as according to the air intake port 603 of the first and second embodiments. Moreover, the apparatus body 60A may include both the air intake ports 603 and 604.

The blower fan 612 is arranged such that the inclination angle of the ventilation surface of the blower fan 612 with respect to the component surface 102*a* of the electrical substrate 611 is set to angle θ, and in the present embodiment, the angle θ is set to 30°. That is, the rotational shaft of the blower fan 612 is set to be inclined by angle θ with respect to the component surface 102*a* when viewed in the Y direction.

The above-mentioned angle θ may be set within the range of $0° < \theta < 90°$ according to the space between the side panel 101 and the left cover 602 or a condition of distribution of airflow between the component surface 102*a* side and the solder surface 102*b* side of the electrical substrate 611. By arranging the blower fan 612 in the above-mentioned manner, the arrangement space of the printer 1D in the Z direction may be reduced.

Arrow A1 in FIG. 14 indicates the direction of outer air passing through the air intake port 604, and in FIG. 14, air is blown toward the upper direction, i.e., −Z direction. The arrow A2 indicates the direction of airflow generated by the blower fan 612. The airflow having passed through the air intake port 604 will become the airflow in the direction of arrow A2 in the blower fan 612, since the ventilation surface of the blower fan 612 is inclined by angle θ with respect to the component surface 102*a* of the electrical substrate 611.

Arrow A3 indicates the direction of airflow passing through the component surface 102*a* side of the electrical substrate 611, wherein the airflow of the blower fan 612 collides against the component surface 102*a* of the electrical substrate 611 and air is blown along the component surface 102*a* of the electrical substrate 611. The arrow A4 indicates the direction of airflow passing through the solder surface 102*b* side of the electrical substrate 611, wherein the airflow of the blower fan 612 collides against the side panel 101 and air is blown along the side panel 101 and the solder surface 102*b* of the electrical substrate 611. The downstream end in the X direction of the electrical substrate 611 is arranged near the rotational shaft of the blower fan 612, and the airflow of the blower fan 612 is separated by the electrical substrate 611 into an airflow on the component surface 102*a* side and an airflow on the solder surface 102*b* side of the electrical substrate 611.

The airflow on the component surface 102*a* side and the airflow on the solder surface 102*b* side of the electrical substrate 611 are merged within the space between the electrical substrate 611 on the rear side of the printer 1D and the apparatus body 60A, and is discharged through the air discharge port 115, which is an opening for discharging air disposed on the rear side of the printer 1D. Arrow A5 illustrates a direction of the airflow passing through the air discharge port 115.

By the airflow described above, the heat generating components mounted on the component surface 102*a* of the electrical substrate 611 and the solder surface 102*b* may be cooled. The direction of airflow may be opposite from the directions of arrows A1, A2, A3, A4, and A5 illustrated in FIGS. 14A and 14B. That is, a configuration may be adopted in which the outer air flows from the component surface 102*a* side and the solder surface 102*b* side of the electrical substrate 611, passes through the blower fan 612, and is discharged through the air intake port 604. In that case, the air discharge port 115 may serve as the opening for taking in air, and the air intake port 604 may serve as the opening for discharging air.

Figure 16:
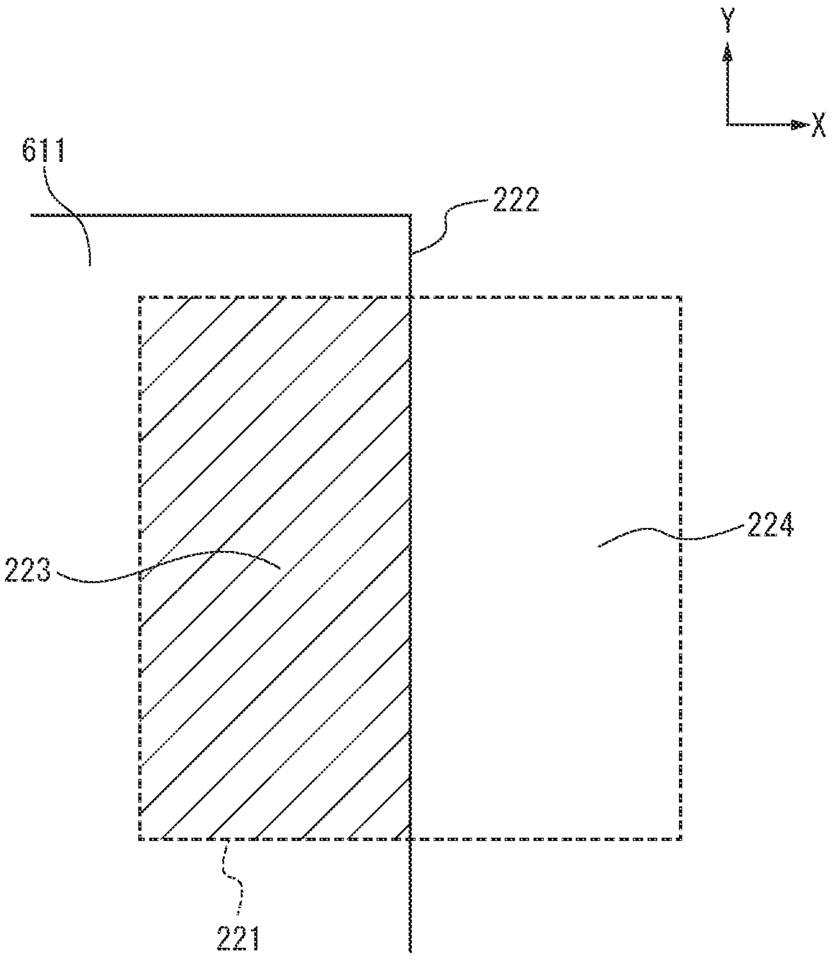
FIG. 16 is a view illustrating a positional relationship between a ventilation surface of the blower fan and an end portion of an electrical substrate.

FIG. 16 is a view illustrating a positional relationship between a ventilation surface of the blower fan 612 according to the present embodiment and an end portion 222 on the downstream side in the X direction of the electrical substrate 611. Dotted line 221 illustrates an outer frame of the ventilation surface of the blower fan 612. In other words, FIG. 16 is a view in which the electrical substrate 611 and the blower fan 612 are projected in the −Z direction. The airflow generated by the blower fan 612 flows in the inner side of the dotted line 221. At least a part of the end portion 222, i.e., outer frame, of the electrical substrate 611 is disposed within the frame of the dotted line 221. In other words, the end portion 222 which is a part of the outer edge of the electrical substrate 611 is arranged to be overlapped with the blower fan 612 when viewed in the Z direction as the orthogonal direction. The end portion 222 is the upstream end in the attaching direction AD (refer to FIG. 1) of the cassette 111, and at least a part of the end portion 222 is arranged to be overlapped with the blower fan 612 when viewed in the Z direction.

A overlapped area 223, i.e., hatched area, between the area on the inner side of the dotted line 221 and the electrical substrate 611 is an area in which the air generated by the blower fan 612 collides against the component surface 102*a* of the electrical substrate 611, and the air in this area 223 is flown toward the component surface 102*a* of the electrical substrate 611. Meanwhile, an area 224 in which the area on the inner side of the dotted line 221 and the electrical substrate 611 are not overlapped is an area in which the air collides against the side panel 101, and the air in this area 224 is flown toward the solder surface 102*b* of the electrical substrate 611.

That is, the component surface 102*a* and the solder surface 102*b* which constitute both surfaces of the electrical substrate 611 may be cooled efficiently. According to the present embodiment, the blower fan 612 is arranged with respect to the electrical substrate 611 such that the electrical substrate 611 directly separates the airflow generated by the blower fan 612 toward the component surface 102*a* side and the solder surface 102*b* side. It may also be possible to dispose a dedicated duct between the blower fan 612 and the electrical substrate 611, and to separate the flow of air generated by the blower fan 612 toward the component surface 102*a* side and the solder surface 102*b* side. However, in a configuration where a dedicated duct is provided, a space of the printer 1D in the Z direction is required, and it becomes difficult to downsize the printer 1D.

By adopting the above-described configuration, an image forming apparatus that may be downsized while efficiently cooling both sides of the electrical substrate 611 may be provided. According to the present embodiment, a monochrome image forming apparatus that forms a monochrome image using one process cartridge has been described, but the present technique may also be applied to a color image forming apparatus including a plurality of process cartridges. Further, a configuration has been illustrated in which the component surface 102*a* is disposed on the left cover 602 side and the solder surface 102*b* is disposed on the side panel 101 side of the electrical substrate 611, but the present technique may also be applied to an opposite configuration in which the component surface 102*a* is disposed on the side panel 101 side and the solder surface 102*b* is disposed on the left cover 602 side. Further, the present technique has been described based on a configuration of a single-sided board, but the present technique may also be applied to a double-sided board or a multi-layered board.

Fourth Embodiment

Next, a fourth embodiment will be described based on the printer 1D of the third embodiment with reference to the drawings. The fourth embodiment differs from the third embodiment in that the positional relationship between the ventilation surface of the blower fan 612 and the outer frame, i.e., end portion 222, of the electrical substrate 611 differs, and that an opening communicated with an inner side of the side panel 101 is disposed on the side panel 101. The other configurations are similar to that described with reference to the third embodiment, such that the configurations similar to the third embodiment are either not shown or denoted with the same reference numbers.

Figure 17:
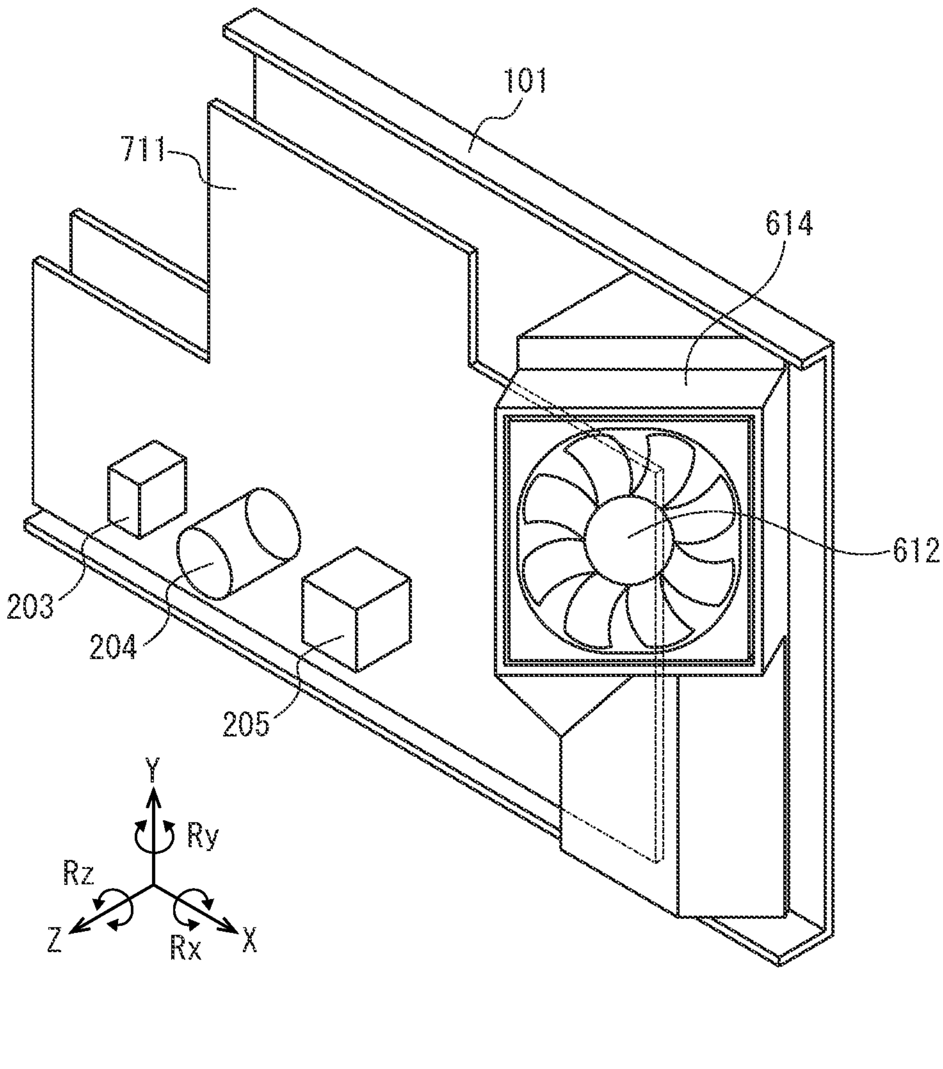
FIG. 17 is a perspective view illustrating an electrical substrate and a blower fan according to a fourth embodiment.

FIG. 17 is a perspective view illustrating a left side surface portion of the printer 1D according to the fourth embodiment viewed from an upper diagonal direction. A part of an upper end of an electrical substrate 711 according to the fourth embodiment is shrunk toward the lower direction compared to the electrical substrate 611 (refer to FIG. 15) of the third embodiment.

Figure 18:
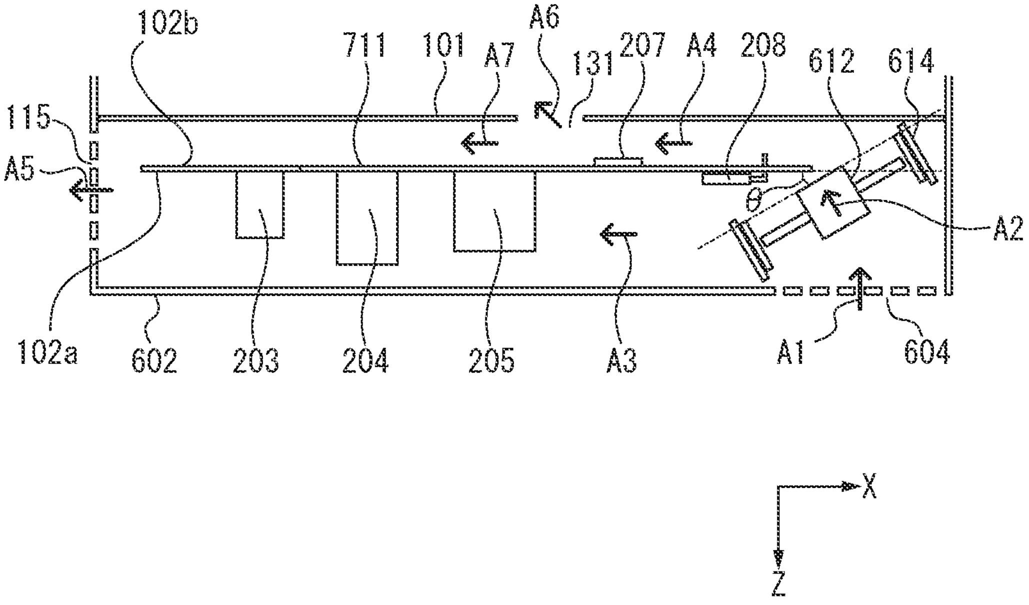
FIG. 18 is a cross-sectional view illustrating a left side portion of the printer.

FIG. 18 is a cross-sectional view of a left side surface of the printer 1D according to the fourth embodiment. The side panel 101 is provided with an opening 131, and air having passed through the opening 131 cools the process cartridge B disposed in the inner side area of the side panel 101.

By providing the opening 131 on the side panel 101, the airflow along the solder surface 102*b* of the electrical substrate 711 flowing in the direction of arrow A4 is separated into an airflow in the direction of arrow A6 and an airflow in the direction of arrow A7. The airflow in the direction of arrow A6 passes through the process cartridge B, and is discharged through an air discharge port (not shown) or a gap disposed on the rear side of the printer 1D.

The airflow in the direction of arrow A7 passes through the solder surface 102*b* side and is discharged through the air discharge port 115 disposed on the rear side of the printer 1D.

According to the above-described configuration, the heat generating components mounted on the component surface 102*a* and the solder surface 102*b* of the electrical substrate 711 and the process cartridge B may be cooled. The direction of airflow may be opposite to the directions of arrows A1, A2, A3, A4, A5, A6, and A7 illustrated in FIG. 18. That is, a configuration may be adopted in which the outer air flows from the component surface 102*a* side and the solder surface 102*b* side of the electrical substrate 711, passes through the blower fan 612, and is discharged through the air intake port 604.

Figure 19:
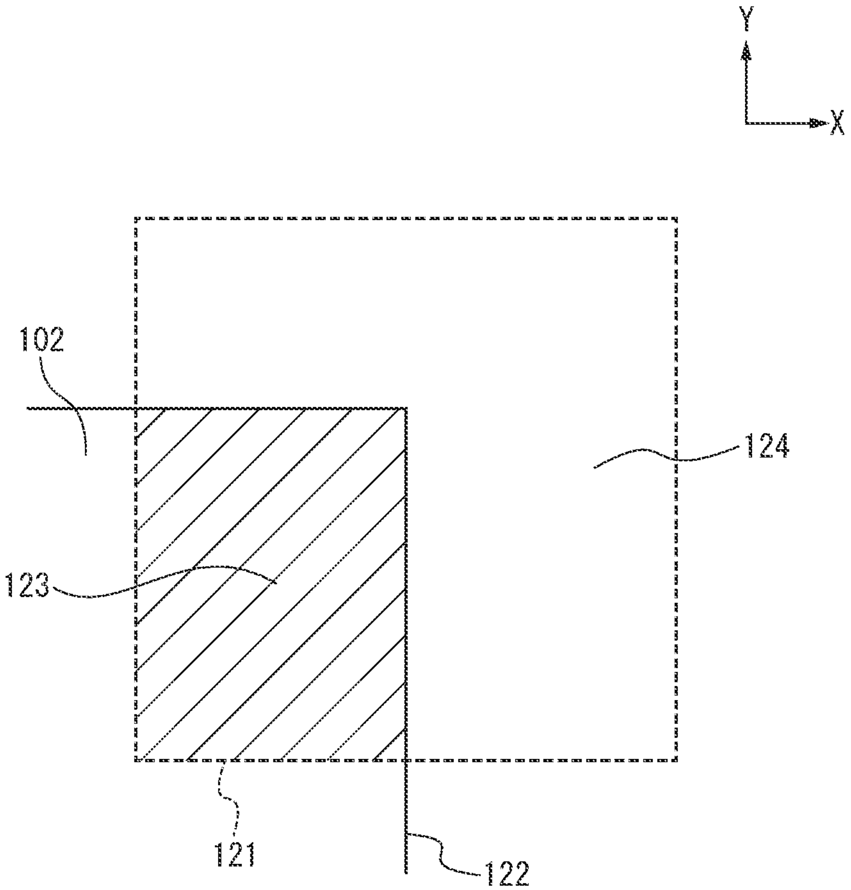
FIG. 19 illustrates a positional relationship between a ventilation surface of the blower fan and the electrical substrate.

FIG. 19 is a view illustrating a positional relationship between a ventilation surface of the blower fan 612 and an outer frame of the electrical substrate 711 according to the fourth embodiment. An upper end of the electrical substrate 711 is shrunk toward the lower direction, such that the area ratio of the area 223, i.e., hatched area, and the area 224 is varied from the third embodiment, and the area 223, i.e., hatched area, is made smaller than the area 224.

According to the present configuration, the amount of air flowing toward the component surface 102*a* side of the electrical substrate 711 is made smaller and the amount of air flown toward the solder surface 102*b* side of the electrical substrate 711 is made greater compared to the configuration of the third embodiment. That is, if the amount of heat generated by the heat generating components of the electrical substrate 711 is greater on the solder surface 102*b* than on the component surface 102*a*, the electrical substrate 711 may be cooled more efficiently by adopting the configuration of the present embodiment.

Modified Example of Fourth Embodiment

Figure 20:
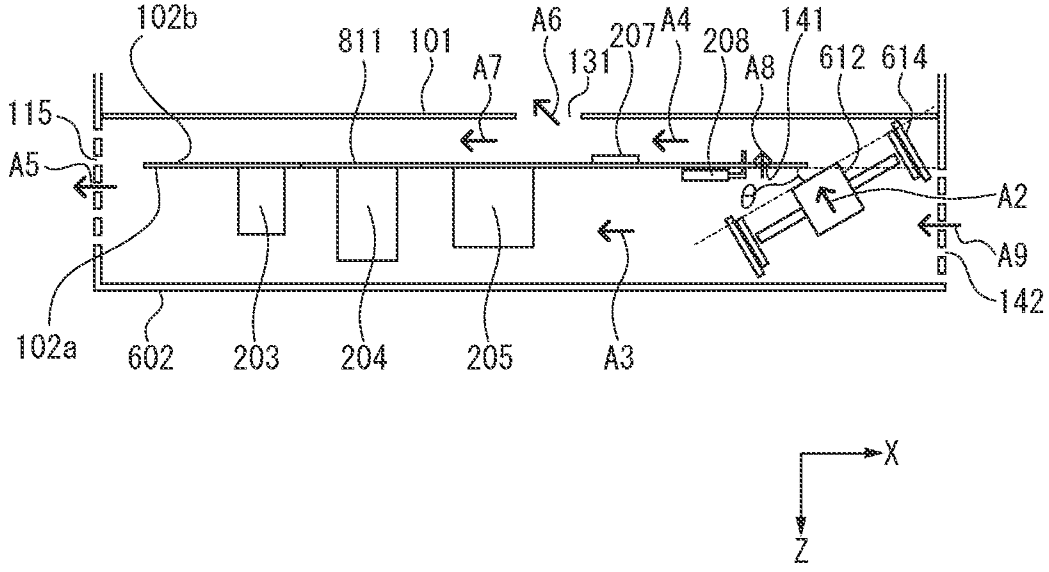
FIG. 20 is a cross-sectional view illustrating a left side portion of a printer according to a modified example of the fourth embodiment.
Figure 21:
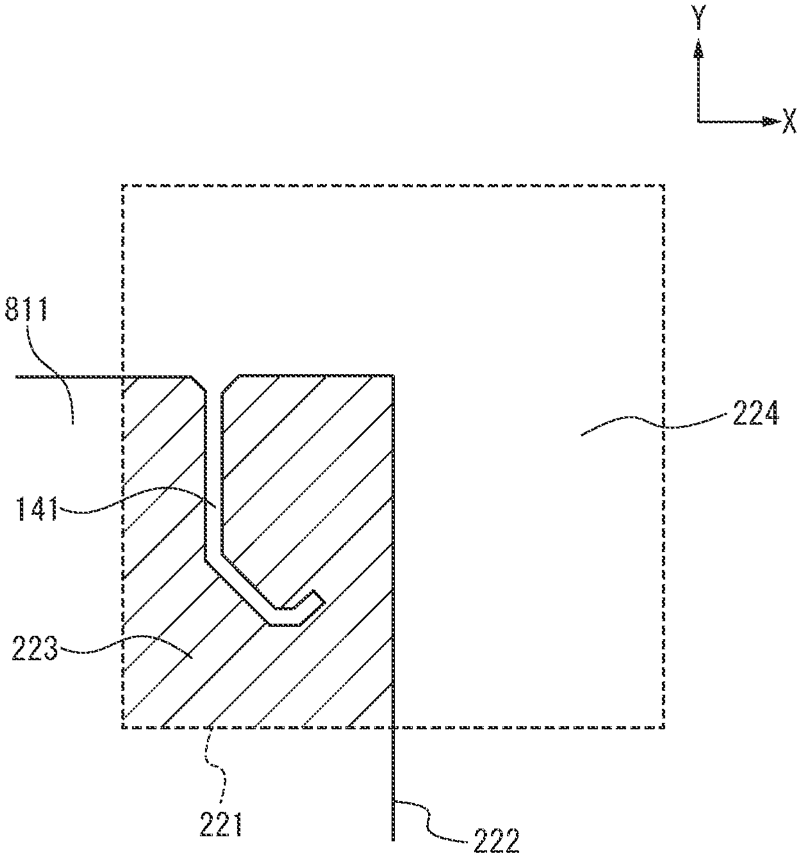
FIG. 21 is a view illustrating a positional relationship between the ventilation surface of the blower fan and a slit of the electrical substrate.

Next, a configuration of a modified example of the fourth embodiment will be described with reference to FIGS. 20 and 21. FIG. 20 is a cross-sectional view of a left side surface of the printer 1D according to the modified example. As illustrated in FIG. 21, an electrical substrate 811 is provided with a slit 141 for leak prevention of a high voltage circuit. The slit 141 serving as an opening is disposed to pass through between the component surface 102*a* and the solder surface 102*b*, and is arranged to be overlapped with the blower fan 612 when viewed in the Z direction. In other words, the slit 141 is positioned within a projection range in which the blower fan 612 is projected in the Z direction with respect to the electrical substrate 811.

As illustrated in FIG. 20, arrow A8 illustrates the direction of airflow in the slit 141. The airflow of arrow A8 passing through the slit 141 is merged with the airflow on the solder surface 102*b* side of the electrical substrate 811 illustrated by arrow A4, and thereafter, is divided into an airflow toward the process cartridge B illustrated by arrow A6 and an airflow toward the solder surface 102*b* of the electrical substrate 811 illustrated by arrow A7.

The slit 141 disposed on the electrical substrate 811 may be utilized as a ventilation hole of air flowing from the component surface 102*a* side toward the solder surface 102*b* side, supplementing the airflow on the solder surface 102*b* side of the electrical substrate 811 and the airflow toward the process cartridge B. This is even more effective in a case where there is not enough airflow on the solder surface 102*b* side of the electrical substrate 611 or not enough airflow toward the process cartridge B according to the positional relationship between the electrical substrate 811 and the blower fan 612.

Other Embodiments

In the first, third, and fourth embodiments, an axial fan was adopted as the blower fan 612, and in the second embodiment, a centrifugal fan was adopted as the blower fan 701, but the present technique is not limited thereto. For example, a compressor or a blower may be adopted instead of a fan as the blower fans 612 and 701. Further, a turbo fan and a sirocco fan are included in the centrifugal fan.

According to any of the aforementioned embodiments, the blower fan 612 or 701 was disposed on the front left corner of the apparatus body surrounded by the left cover 602 and the front cover 601, but the present technique is not limited thereto. For example, the blower fan 612 or 701 may be disposed on the front right corner of the apparatus body. In that case, the configuration around the air intake port 603 and the blower fan 612 or 701 is preferably disposed on the right side of the apparatus body.

Further according to the first and second embodiments, the blower fan 612 or 701 was disposed to be overlapped with the air intake port 603 when viewed in the attaching direction AD, but the present technique is not limited thereto. For example, if sufficient air may be taken in through the air intake port 603, the blower fan 612 or 701 may be arranged at a position that is not overlapped with the air intake port 603 when viewed in the attaching direction AD.

Further according to the first and second embodiments, the rotational axis RA or RA2 the blower fan 612 or 701 was inclined with respect to the attaching direction AD, but the present technique is not limited thereto. For example, if the air intake ability of the blower fan is sufficiently high, the blower fan may be arranged such that the rotational axis is parallel with the width direction W. Further, if the blower fan is small or if the width of the apparatus body is sufficiently wide, the blower fan may be arranged such that the rotational axis is parallel with the attaching direction AD.

According to the aforementioned embodiments, the auxiliary air intake port 615 was disposed on the inclined surface 602*a* of the left cover 602, but the present technique is not limited thereto. For example, if sufficient air may be taken in to the inner side of the apparatus body through the air intake port 603, the auxiliary air intake port 615 may be omitted. Further, the auxiliary air intake port 615 may be disposed on any position of the exterior of the printer.

According to the aforementioned embodiments, the printer was equipped with the cover member 121 provided to be openable and closable as a part of the manual sheet feed portion 12, but the present technique is not limited thereto. For example, in a printer not equipped with the manual sheet feed portion 12, the cover member 121 may be configured to be fixed to the front cover 601 instead of being disposed in an openable and closable manner.

According to the aforementioned embodiments, the printer adopts an electrophotographic system, but the present technique is not limited thereto. For example, the present technique may be applied to an inkjet image forming apparatus that forms images on sheets by discharging ink through nozzles.

Further, the respective embodiments and modified examples described above may be combined arbitrarily. For example, the positional relationship between the electrical substrate 611, 711, or 811 and the blower fan 612 illustrated in FIGS. 12 to 22 may be applied to the first and second embodiments illustrated in FIGS. 1 to 11.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-012671, filed Jan. 31, 2023, Japanese Patent Application No. 2023-012439, filed Jan. 31, 2023, Japanese Patent Application No. 2023-104676, filed Jun. 27, 2023, and Japanese Patent Application No. 2023-211538, filed Dec. 14, 2023, which are hereby incorporated by reference herein in its their entirety.

What is claimed is:

1. An image forming apparatus comprising:
- an apparatus body including an image forming portion configured to form an image on a sheet;
- a sheet storage portion configured to store the sheet and configured to be drawn out of and attached to the apparatus body; and
- an air blowing portion disposed within the apparatus body and configured to generate an airflow,
- wherein the apparatus body includes:
  - a body portion oriented toward an upstream side in an attaching direction of the sheet storage portion, the body portion including an air intake port through which air taken in by the air blowing portion passes; and
  - a cover member that is disposed upstream of the body portion in the attaching direction and provided to be openable and closable with respect to the body portion, and that covers a part of the body portion in a closed state,
- wherein the sheet storage portion includes:
  - a storage portion body configured to store the sheet; and
  - a storage portion cover arranged upstream of the storage portion body in the attaching direction, and
- wherein, in a state where the cover member is closed with respect to the body portion and the sheet storage portion is attached to the apparatus body, the air intake port is disposed to be overlapped with each of the cover member and the storage portion cover when viewed in the attaching direction and is covered by each of the cover member and the storage portion cover.

2. The image forming apparatus according to claim 1, wherein the air blowing portion is configured to take in outer air to an inner side of the apparatus body through the air intake port.

3. The image forming apparatus according to claim 1, wherein the air intake port is disposed such that at least a part of the air intake port is overlapped with the air blowing portion when viewed in the attaching direction.

4. The image forming apparatus according to claim 1, wherein the air blowing portion includes a rotary member configured to generate an airflow by rotating about a rotational axis, and
- wherein the rotational axis is inclined with respect to the attaching direction.

5. The image forming apparatus according to claim 4, wherein the air blowing portion is an axial fan configured to take in and discharge air along the rotational axis, that is arranged on a first side of the apparatus body in an orthogonal direction orthogonal to the attaching direction and a vertical direction, and that is arranged on an upstream side of the apparatus body in the attaching direction, and
- wherein the rotational axis is extended from the first side to a second side in the orthogonal direction of the apparatus body toward a downstream side in the attaching direction.

6. The image forming apparatus according to claim 4, wherein the air blowing portion is a centrifugal fan configured to take in air along the rotational axis and discharge air to a direction intersecting the rotational axis, that is arranged on a first side of the apparatus body in an orthogonal direction orthogonal to the attaching direction and a vertical direction, and that is arranged on an upstream side of the apparatus body in the attaching direction, and
- wherein the rotational axis is extended from a second side to the first side in the orthogonal direction of the apparatus body toward a downstream side in the attaching direction.

7. The image forming apparatus according to claim 1, wherein the apparatus body includes a duct member configured to guide air discharged through the air blowing portion toward a cooling target.

8. The image forming apparatus according to claim 7, wherein the cooling target includes a substrate.

9. The image forming apparatus according to claim 8, wherein the apparatus body includes a wall portion configured to divide a space disposed between the air intake port and the air blowing portion from a space in which the substrate is disposed.

10. The image forming apparatus according to claim 9, wherein the apparatus body includes a holder configured to support the air blowing portion, and
- wherein the wall portion is formed integrally with the holder.

11. The image forming apparatus according to claim 9, wherein the apparatus body includes a side cover configured to constitute one side surface, of an exterior of the image forming apparatus, in an orthogonal direction orthogonal to the attaching direction and a vertical direction, and
- wherein the wall portion is disposed between the side cover and the substrate in the orthogonal direction.

12. The image forming apparatus according to claim 11, wherein a part of the substrate is disposed to be overlapped with the wall portion when viewed in the orthogonal direction.

13. The image forming apparatus according to claim 11, wherein a part of the substrate is disposed to be overlapped with the air blowing portion when viewed in the orthogonal direction.

14. The image forming apparatus according to claim 11, wherein the wall portion is configured to form, together with the side cover, an air flow passage through which air blowing from the air intake port toward the air blowing portion passes.

15. The image forming apparatus according to claim 8, wherein the apparatus body includes a side cover configured to constitute one side surface, of an exterior of the image forming apparatus, in an orthogonal direction orthogonal to the attaching direction and a vertical direction,
- wherein the substrate includes a first surface being opposed to the side cover, and a second surface disposed on an opposite side from the first surface in the orthogonal direction, and
- wherein the image forming apparatus further comprises:
  - a first heat generating component mounted on the first surface; and a second heat generating component mounted on the second surface.

16. The image forming apparatus according to claim 15, wherein the air blowing portion includes a rotary member configured to generate an airflow by rotating about a rotational axis, wherein the rotational axis is inclined with respect to the first surface of the substrate, wherein a part of an outer edge of the substrate is disposed to be overlapped with the air blowing portion when viewed in the orthogonal direction, and wherein the airflow generated by the air blowing portion is divided by the substrate into an airflow along the first surface of the substrate and an airflow along the second surface.

17. The image forming apparatus according to claim 16, wherein at least a part of an upstream end of the substrate in the attaching direction is disposed to be overlapped with the air blowing portion when viewed in the orthogonal direction.

18. The image forming apparatus according to claim 16, wherein the apparatus body includes an air discharge port through which the airflow generated by the air blowing portion is discharged.

19. The image forming apparatus according to claim 16, wherein the substrate includes an opening that is disposed to pass through the first surface and the second surface and that is disposed to be overlapped with the air blowing portion when viewed in the orthogonal direction.

20. The image forming apparatus according to claim 16, wherein the apparatus body includes a side panel made of a sheet metal, and wherein the substrate is configured to be electrically grounded by being retained by the side panel.

21. The image forming apparatus according to claim 20, wherein the side panel includes an opening through which a part of the airflow flowing along the second surface passes.

22. The image forming apparatus according to claim 15, wherein the first heat generating component is a capacitor, and wherein the second heat generating component is a solder.

23. The image forming apparatus according to claim 15, wherein the first heat generating component is a resistor element, and wherein the second heat generating component is a solder.

24. The image forming apparatus according to claim 7, wherein the image forming portion includes a process cartridge including an image bearing member configured to bear a toner image, and wherein the cooling target includes the process cartridge.

25. The image forming apparatus according to claim 7, further comprising a fixing portion configured to fix an image, formed on a sheet by the image forming portion, onto the sheet by applying heat and pressure to the image, wherein the cooling target includes the fixing portion.

26. The image forming apparatus according to claim 1, wherein the apparatus body includes another air intake port that is disposed at a position that differs from that of the air intake port and through which air taken in by the air blowing portion passes.

27. The image forming apparatus according to claim 1, wherein the cover member and the storage portion cover are flush in a state where the sheet storage portion is attached to the apparatus body.

28. The image forming apparatus according to claim 1, wherein the cover member and the storage portion cover are aligned in a vertical direction in a state where the sheet storage portion is attached to the apparatus body.

29. The image forming apparatus according to claim 1, wherein the air intake port is configured not to be visually confirmed when viewed in the attaching direction in a state where the cover member is closed with respect to the body portion and the sheet storage portion is attached to the apparatus body, and to be visually confirmed when viewed in the attaching direction in a state where the cover member is opened with respect to the body portion.

30. The image forming apparatus according to claim 1, wherein the air intake port is configured to be visually confirmed when viewed obliquely with respect to the attaching direction.

31. The image forming apparatus according to claim 1, wherein an area in which the air intake port is disposed has a height of ½ a height of the apparatus body or more in a vertical direction.

* * * * *